US011235397B2

(12) United States Patent
Frota de Souza Filho et al.

(10) Patent No.: US 11,235,397 B2
(45) Date of Patent: Feb. 1, 2022

(54) SIDE-ACTIVATED MODULAR DRILL

(71) Applicant: Kennametal Inc., Latrobe, PA (US)

(72) Inventors: Ruy Frota de Souza Filho, Latrobe, PA (US); Nicholas J. Henry, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/382,120

(22) Filed: Dec. 16, 2016

(65) Prior Publication Data
US 2018/0169771 A1    Jun. 21, 2018

(51) Int. Cl.
B23B 51/02 (2006.01)
B23B 51/04 (2006.01)

(52) U.S. Cl.
CPC ............ B23B 51/02 (2013.01); B23B 51/048 (2013.01); B23B 2251/02 (2013.01)

(58) Field of Classification Search
CPC ............ B23B 2251/50; B23B 2251/02; B23B 2240/04; B23B 51/02; B23B 31/06; B23B 51/048; B25B 33/00; B25B 13/48; Y10T 408/95; Y10T 408/957
USPC .......................................................... 81/488
See application file for complete search history.

(56) References Cited

U.S. PATENT DOCUMENTS

| 124,089 A | 2/1872 | Shepardson |
| 318,994 A | 6/1885 | Lake |
| 1,461,023 A | 7/1923 | Paul |
| 1,461,548 A * | 7/1923 | West ...................... B23B 51/00 175/394 |
| 1,946,158 A | 2/1934 | Heinrich |

(Continued)

FOREIGN PATENT DOCUMENTS

| CN | 101801576 A | 9/2012 |
| CN | 103692001 A | 4/2014 |

(Continued)

OTHER PUBLICATIONS

Jun. 11, 2018 Non-Final OA.

(Continued)

Primary Examiner — Eric A. Gates
Assistant Examiner — Chwen-Wei Su
(74) Attorney, Agent, or Firm — Larry R. Meenan

(57) ABSTRACT

A rotary cutting tool with a shank and an interchangeable cutting tip, wherein the shank includes a pocket which receives the interchangeable cutting tip via an interference fit. The pocket includes two centering wall portions which, when viewed along a central longitudinal axis, are oriented at a first angle with respect to one another, the first angle being greater than zero. The interchangeable cutting tip is axially displaceable between: an initial position, assumed upon being received in the pocket of the shank; a clamped position, wherein the interchangeable cutting tip is fixedly held with respect to the shank; and a bump-off position, wherein the interchangeable cutting tip is not fixedly held. A holding element holds the interchangeable cutting tip in the clamped position, and a bump-off element displaces the interchangeable cutting tip between the clamped position and the bump-off position. Other variants and embodiments are broadly contemplated herein.

19 Claims, 18 Drawing Sheets

(56) References Cited

U.S. PATENT DOCUMENTS

| | | | |
|---|---|---|---|
| 2,167,014 A | | 7/1939 | Joseph |
| 2,399,939 A | * | 5/1946 | Phillips .................. B23B 31/06 |
| | | | 173/104 |
| 2,400,856 A | | 5/1946 | Thompson |
| 2,485,799 A | | 10/1949 | Woytych |
| 2,801,614 A | * | 8/1957 | Dieterich ................ B23B 31/06 |
| | | | 279/103 |
| 2,847,225 A | * | 8/1958 | Kosinski ................. B23B 31/07 |
| | | | 279/103 |
| 3,049,033 A | | 8/1962 | Benjamin |
| 3,311,023 A | * | 3/1967 | Kaiser .................... B23B 31/06 |
| | | | 408/239 R |
| 3,436,990 A | | 4/1969 | Tourison |
| 4,611,672 A | | 9/1986 | Holzl |
| 4,632,593 A | | 12/1986 | Stashko |
| 4,726,268 A | | 2/1988 | Erickson |
| 4,744,704 A | | 5/1988 | Galvefors |
| 4,813,829 A | | 3/1989 | Koppelmann |
| 4,854,789 A | | 8/1989 | Evseanko, Jr. |
| 4,913,607 A | | 4/1990 | von Haas |
| 5,407,308 A | | 4/1995 | Takayoshi |
| 5,452,971 A | * | 9/1995 | Nevills ................... B23B 51/00 |
| | | | 408/229 |
| 5,599,145 A | | 2/1997 | Reinauer et al. |
| 5,622,460 A | | 4/1997 | Satran et al. |
| 5,678,645 A | | 10/1997 | Tibbitts et al. |
| 5,704,742 A | | 1/1998 | Reinauer |
| 5,820,318 A | | 10/1998 | Danielsson et al. |
| 5,904,448 A | | 5/1999 | Lee |
| 5,904,455 A | * | 5/1999 | Krenzer .................. B23B 51/00 |
| | | | 408/144 |
| 5,957,631 A | | 9/1999 | Hecht |
| 5,957,635 A | | 9/1999 | Nuzzi |
| 5,961,259 A | | 10/1999 | Ziegler |
| 5,971,673 A | | 10/1999 | Berglund |
| 6,012,881 A | | 1/2000 | Scheer |
| 6,109,152 A | | 8/2000 | Hecht |
| 6,109,841 A | * | 8/2000 | Johne ..................... B23B 51/00 |
| | | | 408/144 |
| 6,196,769 B1 | | 3/2001 | Satran |
| 6,276,879 B1 | | 8/2001 | Hecht |
| 6,447,222 B2 | | 9/2002 | Kojima |
| 6,485,235 B1 | | 11/2002 | Mast et al. |
| 6,506,003 B1 | * | 1/2003 | Erickson ................. B23B 51/02 |
| | | | 408/226 |
| 6,514,019 B1 | * | 2/2003 | Schulz ................ B23B 51/0009 |
| | | | 408/227 |
| 6,530,728 B2 | | 3/2003 | Eriksson |
| 6,582,164 B1 | * | 6/2003 | McCormick .......... B23B 31/113 |
| | | | 408/144 |
| 6,783,307 B2 | | 8/2004 | Lindblom |
| 6,783,308 B2 | | 8/2004 | Lindblom |
| 7,070,367 B2 | | 7/2006 | Krenzer |
| 7,131,799 B2 | | 11/2006 | Stokey |
| 7,309,196 B2 | | 12/2007 | Ruy Frota de Souza |
| 7,311,480 B2 | | 12/2007 | Heule et al. |
| 7,360,974 B2 | | 4/2008 | Borschert et al. |
| 7,377,730 B2 | | 5/2008 | Hecht et al. |
| 7,407,350 B2 | * | 8/2008 | Hecht ..................... B23B 51/02 |
| | | | 407/34 |
| 7,467,915 B2 | | 12/2008 | Frota de Souza |
| 7,478,983 B2 | | 1/2009 | Guy |
| 7,625,161 B1 | | 12/2009 | Ruy Frota de Souza |
| 7,972,094 B2 | | 7/2011 | Men et al. |
| 7,997,836 B2 | | 8/2011 | Kim et al. |
| 8,312,615 B2 | | 11/2012 | Frota de Souza Filho |
| 8,449,227 B2 | | 5/2013 | Danielsson |
| 8,550,756 B2 | | 10/2013 | Borschert et al. |
| 8,678,722 B2 | | 3/2014 | Aare |
| 8,702,356 B2 | | 4/2014 | Hecht et al. |
| 8,721,235 B2 | | 5/2014 | Kretzschmann et al. |
| 8,784,018 B2 | | 7/2014 | Pábel |
| 8,840,347 B2 | | 9/2014 | Aare |
| 8,876,444 B1 | | 11/2014 | Chanturidze |
| 8,876,446 B2 | | 11/2014 | Shaheen |
| 8,882,413 B2 | | 11/2014 | Hecht |
| 8,992,143 B2 | * | 3/2015 | Glimpel .................. B23B 51/02 |
| | | | 408/226 |
| 9,073,129 B2 | | 7/2015 | Craig et al. |
| 9,108,251 B2 | | 8/2015 | Craig |
| 9,162,295 B2 | | 10/2015 | Päbel et al. |
| 9,205,498 B2 | | 12/2015 | Jaeger |
| 9,468,979 B2 | | 10/2016 | Hecht |
| 9,545,699 B2 | | 1/2017 | Furusawa et al. |
| 9,555,484 B2 | | 1/2017 | Koga |
| 9,770,766 B2 | | 9/2017 | Singer-Schnoeller |
| 9,895,754 B2 | | 2/2018 | Mani |
| 10,207,337 B2 | | 2/2019 | Frota de Souza Filho |
| 10,213,845 B2 | | 2/2019 | Schwaegerl et al. |
| 10,471,522 B2 | | 11/2019 | Yamamoto et al. |
| 2001/0026738 A1 | | 10/2001 | Kojima |
| 2002/0015623 A1 | | 2/2002 | Eriksson |
| 2002/0168239 A1 | | 11/2002 | Mast et al. |
| 2003/0091402 A1 | | 5/2003 | Lindblom |
| 2003/0091403 A1 | | 5/2003 | Lindblom |
| 2003/0219321 A1 | | 11/2003 | Borschert et al. |
| 2005/0098359 A1 | | 5/2005 | Lee |
| 2006/0051172 A1 | | 3/2006 | Johnson et al. |
| 2007/0274794 A1 | | 11/2007 | Cirino |
| 2008/0003072 A1 | | 1/2008 | Kim et al. |
| 2008/0101878 A1 | | 5/2008 | Skilberg |
| 2010/0021253 A1 | | 1/2010 | Frejd |
| 2010/0104384 A1 | | 4/2010 | Orlov et al. |
| 2010/0303561 A1 | | 12/2010 | Fouquer |
| 2010/0322723 A1 | | 12/2010 | Danielsson |
| 2010/0322731 A1 | | 12/2010 | Aare |
| 2011/0008114 A1 | | 1/2011 | Wang |
| 2011/0110735 A1 | | 5/2011 | Klettenheimer |
| 2011/0110739 A1 | | 5/2011 | Frisendahl |
| 2011/0114393 A1 | | 5/2011 | Dolan et al. |
| 2011/0236145 A1 | | 9/2011 | Paebel et al. |
| 2012/0014760 A1 | | 1/2012 | Glimpel et al. |
| 2012/0014860 A1 | | 1/2012 | Bryn |
| 2012/0148358 A1 | | 6/2012 | Hecht et al. |
| 2012/0230787 A1 | | 9/2012 | Harif |
| 2013/0042462 A1 | | 2/2013 | Frota De Souza Filho |
| 2013/0259590 A1 | | 10/2013 | Shaheen |
| 2014/0154023 A1 | | 6/2014 | Craig |
| 2014/0255117 A1 | | 9/2014 | Tseng |
| 2014/0353931 A1 | | 12/2014 | Frota de Souza Filho et al. |
| 2014/0360334 A1 | | 12/2014 | Singer-Schnoeller |
| 2014/0363257 A1 | * | 12/2014 | Parker ................ F16B 23/0046 |
| | | | 411/405 |
| 2015/0147128 A1 | | 5/2015 | Saji |
| 2015/0306686 A1 | | 10/2015 | Mani |
| 2015/0328693 A1 | | 11/2015 | Koga |
| 2015/0360300 A1 | | 12/2015 | Hecht |
| 2016/0067785 A1 | | 3/2016 | Wang et al. |
| 2016/0263664 A1 | * | 9/2016 | Son ........................ B23B 51/02 |
| 2017/0028479 A1 | | 2/2017 | Haimer |
| 2018/0065191 A1 | | 3/2018 | Hecht |
| 2018/0169771 A1 | | 6/2018 | Frota de Souza Filho et al. |
| 2019/0126361 A1 | | 5/2019 | Hecht et al. |

FOREIGN PATENT DOCUMENTS

| | | |
|---|---|---|
| CN | 102413974 A | 6/2014 |
| CN | 205020901 U | 2/2016 |
| CN | 103249511 A | 8/2016 |
| CN | 109365844 A | 12/2020 |
| DE | 803143 C | 3/1951 |
| DE | 7043832 U | 3/1971 |
| DE | 19710996 | 12/1999 |
| DE | 19834635 C2 | 7/2001 |
| DE | 202011050277 | 7/2012 |
| EP | 0343653 B1 | 7/1991 |
| EP | 1864733 A1 | 12/2007 |
| GB | 1341651 A | 12/1975 |
| JP | 2000084718 A | 3/2000 |
| JP | 2004261931 A | 9/2004 |
| JP | 2004276134 | 10/2004 |
| JP | 2004306170 A | 11/2004 |
| JP | 2004330390 A | 11/2004 |

(56) References Cited

FOREIGN PATENT DOCUMENTS

| | | | |
|---|---|---|---|
| JP | 2004330391 A | 11/2004 | |
| JP | 2006272472 A | 10/2006 | |
| JP | 2016193461 | 11/2016 | |
| JP | 2016055353 A | 10/2018 | |
| SE | 516366 | 4/2001 | |
| WO | WO1996034714 A1 | 11/1996 | |
| WO | WO2006001551 | 1/2006 | |
| WO | WO2009050789 A1 | 4/2009 | |
| WO | WO2011058532 | 5/2011 | |
| WO | WO13033740 | 3/2013 | |
| WO | WO2017207793 A1 | 12/2017 | |

OTHER PUBLICATIONS

Apr. 14, 2021 Notice of Allowance US App. No. 2020/0180047A1.
Feb. 24, 2021 Notice of Allowance US App. No. 2020/0180047A1.
Feb. 5, 2021 Advisory Action (PTOL-303) 1 US App. No. 2019/0388976.
Jan. 15, 2021 Office Action (non-US) CN App. No. 110062676A.
Dec. 30, 2020 Final Office Action (US Only) US App. No. 2019/0388976.
Dec. 4, 2020 Notice of Allowance CN App. No. 108687385A.
Nov. 25, 2020 Notice of Allowance US App. No. 2020/0180047A1.
Oct. 22, 2020 Final Office Action (US Only) US App. No. 2020/0180047A1.
Jul. 29, 2020 English translation of First OA for CN App. No. 201810251132X.
Jul. 23, 2020 Office action (3 months) (US Only) US App. No. 2019/0388976.
Jun. 29, 2020 Office Action (non-US) CN App. No. 108687385A.
Jun. 3, 2020 Office Action (non-US) CN App. No. 110062676A.
Jun. 3, 2020 English translation of First OA for CN App No. 201780076453.4.
Apr. 29, 2020 Office action (3 months) (US Only) U.S. Appl. No. 16/214,717.
Feb. 3, 2020 Examination notification CN App. No. 108687385A.
Nov. 15, 2019 Examination notification CN App. No. 110062676A.
Jun. 27, 2019 International Search Report Transmitted.
Oct. 3, 2018 Notice of Allowance U.S. Appl. No. 10/207,337.
Jan. 15, 2021 OA CN App. No. 110062676A English Translation.
Jun. 30, 2021 Office action (3 months) (US Only) US App. No. 2019/0388976.
May 26, 2021 Office Action (non-US) CN App. No. 110062676A.
Nov. 29, 2021 Final OA—U.S. Appl. No. 16/445,741.
Nov. 8, 2021 Foreign OA—DE App. No. 102021106415.5.

\* cited by examiner

SIDE-ACTIVATED MODULAR DRILL

BACKGROUND

A great variety of drills with replaceable cutting tips (or cutting inserts) are known conventionally. Illustrative examples may be appreciated via U.S. Pat. Nos. 7,309,196 and 7,467,915 to Frota de Souza, Filho, and U.S. Pat. No. 9,205,498 to Jaeger. Such drills involve replaceable cutting heads which are mounted on shanks. Typically, though by no means exclusively, the cutting heads and shanks can display continuous and complementing configuration as fluted drills. Each shank will normally include a structure for retaining and rotating an associated cutting head, while the associated cutting head will have a complementing structure for being retained and rotated by the shank.

Often, challenges are encountered conventionally with respect to deformation and failure during the service life of a drill, due (at least in part) to a concentration of stresses imposed on the retaining and drive structure of the shank during ordinary service. This may unduly limit the useful service life of the drill, thus relevant improvements and modifications continue to be sought that might help mitigate the effect of known problems and constraints.

SUMMARY

In summary, one aspect of the invention provides a rotary cutting tool comprising: a shank; and an interchangeable cutting tip; the shank comprising a pocket which receives the interchangeable cutting tip via an interference fit; the pocket comprising two centering wall portions which, when viewed along a central longitudinal axis of the shank, are oriented at a first angle with respect to one another, the first angle being greater than zero; the interchangeable cutting tip being axially displaceable between: an initial position, which is assumed by the interchangeable cutting tip upon being received in the pocket of the shank; a clamped position, wherein the interchangeable cutting tip is fixedly held with respect to the shank; and a bump-off position, wherein the interchangeable cutting tip is not fixedly held with respect to the shank; a holding element which holds the interchangeable cutting tip in the clamped position; and a bump-off element which displaces the interchangeable cutting tip between the clamped position and the bump-off position.

Another aspect of the invention provides a shank for a rotary cutting tool, the shank comprising: a pocket which receives an interchangeable cutting tip via an interference fit; the pocket comprising two centering wall portions which, when viewed along a central longitudinal axis of the shank, are oriented at a non-zero angle with respect to one another; a holding element which holds an interchangeable cutting tip in the clamped position; a bump-off element which displaces an interchangeable cutting tip between the clamped position and the bump-off position; and a pair of torque transmission walls for rotationally driving an interchangeable cutting insert about the central longitudinal axis of the shank; the torque transmission walls each being oriented at a predetermined angle with respect to a defining dimension of at least one of the centering wall portions, the third angle being between about 75 degrees and about 120 degrees.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
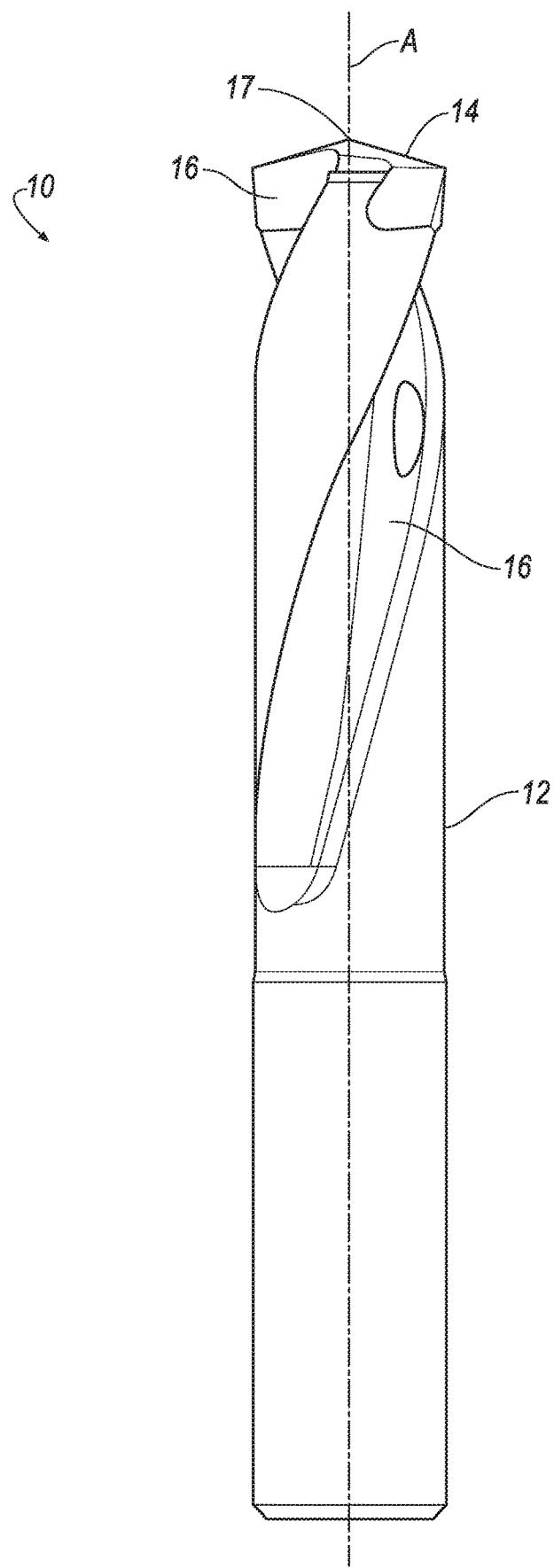
FIG. 1 provides an elevational view of a rotary cutting tool which includes a shank and an interchangeable cutting insert.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein. To facilitate easier reference, in advancing from FIG. 1 to and through FIG. 12D, a reference numeral is advanced by a multiple of 100 in indicating a substantially similar or analogous component or element with respect to at least one component or element found in one or more earlier figures among FIGS. 1-12D.

FIG. 1 shows a rotary cutting tool 10 in the form of a drill, having a shank 12 and a cutting insert 14, which are both produced as separate parts. The cutting insert 14 can be fastened to, or installed on, the shank 12 in a detachable and interchangeable manner. Similarly, the rotary cutting tool, for performing rotary cutting operations on a workpiece, can also be designed as a countersinking, milling or reaming tool. For purely illustrative purposes, the cutting tool 10 shown in FIG. 1 is a twist drill which includes a pair of helical flutes 16 disposed along the sides of the drill, in diametric opposition to one another. Each flute 16 extends over the shank 12 and the cutting insert 14, wherein the latter also includes a drill point 17.

Generally, a central longitudinal axis A is defined through the cutting tool 10 (common to both the shank 12 and the cutting insert 14), about which the cutting tool 10 rotates during operation. A "cutting insert" may alternatively be referred to, herein and elsewhere, with any of a variety of other suitable terms such as "tip", "insert", "head", "cutting tip" or "cutting head".

It should be noted that each flute 16, as shown in FIG. 1, includes portions that are disposed in both the shank 12 and the cutting insert 16 alike. Thus, once cutting insert 14 is installed on shank 12, corresponding flute portions in the cutting insert 14 and shank 12, alike, will align to form flutes 16 that are generally continuous and undistorted. Although two flutes 16 are depicted herein, it should be understood that any number of flutes (including only one) is possible.

Figure 2:
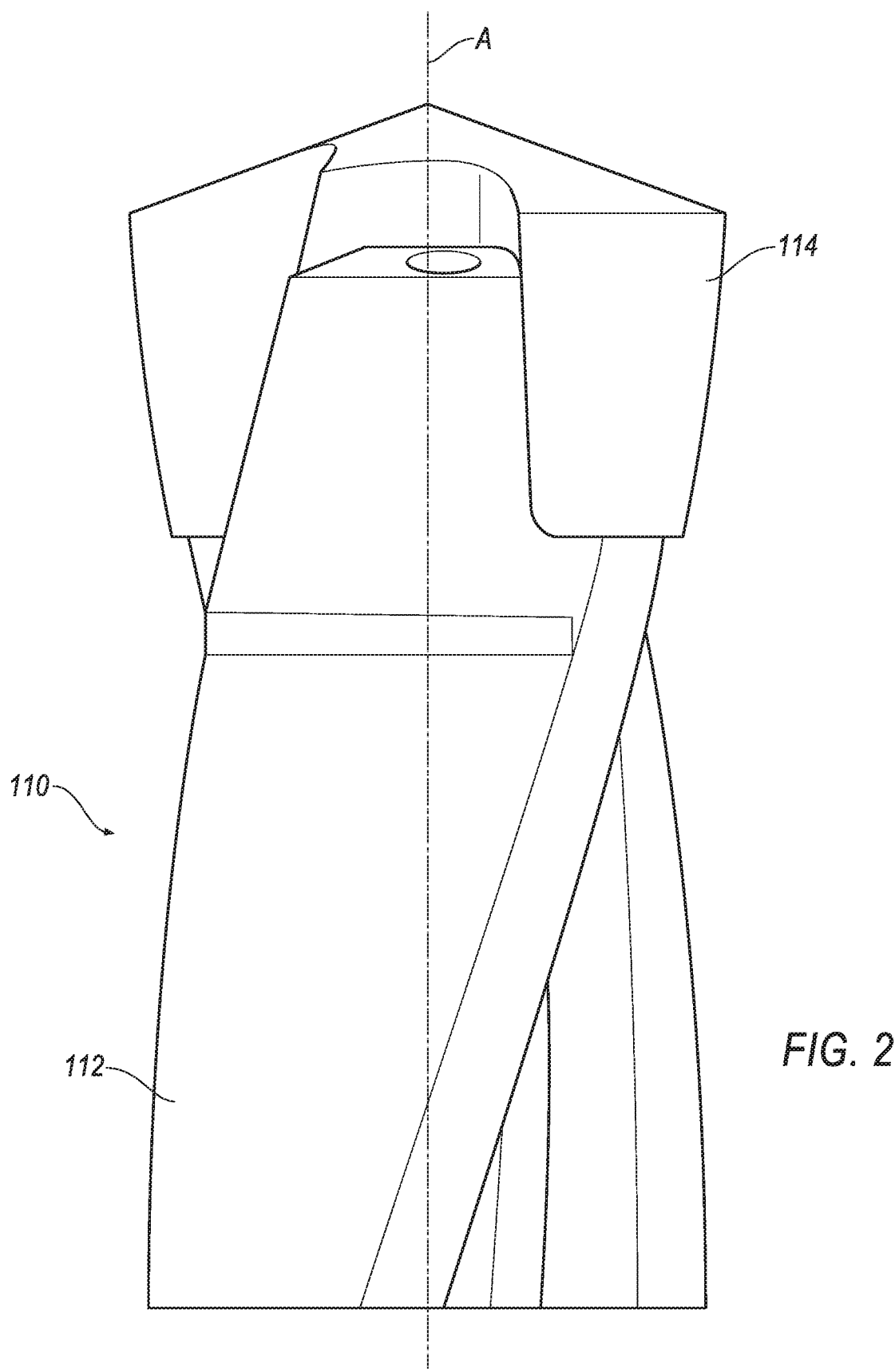
FIG. 2 provides an elevational view of a shank and cutting insert in a cutting tool 110.

FIG. 2 provides an elevational view of a shank 112 and cutting insert 114 in a cutting tool 110, in accordance with at least one embodiment. As shown, the cutting insert 114 is fixedly positioned at an axial end of the shank 112, in preparation for operation. Further details of a shank and cutting insert in accordance with at least one embodiment will be better appreciated from the ensuing discussion.

In the depiction of FIG. 2, cutting head 114 emerges at a leading end of cutting tool 110. A "leading end", defined herein for semantic purposes, represents that end which engages a work piece when cutting. During cutting operations, cutting tool 110 is rotated, and advanced progressively into a workpiece as cutting progresses. That end of cutting tool located oppositely to the leading end can be referred to as the "trailing end". The terms "leading end" and "trailing end" are semantic devices which apply equally to shank 12 and cutting head 14 as they connote directional orientation with respect to longitudinal axis A rather than specific structure.

Figure 3:
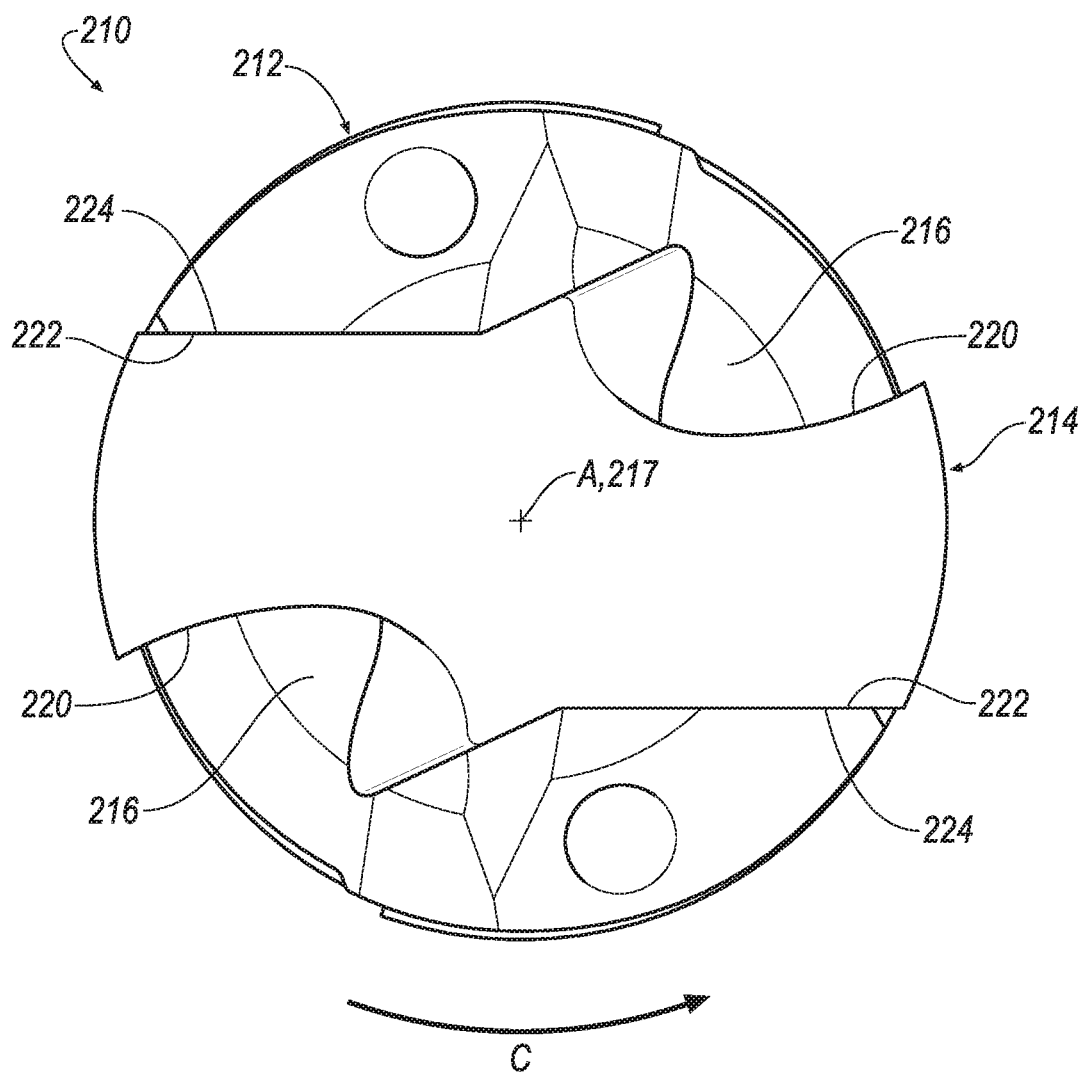
FIG. 3 provides a plan view of a conventional cutting tool with a shank, and a cutting insert installed therein.

By way of general comparison in accordance with at least one embodiment, FIG. 3 provides a plan view of a conventional cutting tool 210 with a shank, and a cutting insert installed therein. As shown, the insert 214 is mounted at an axial end of the shank 212, for engaging in a cutting operation when the cutting tool 210 is rotated about longitudinal axis A in a counter-clockwise cutting direction C (when viewed with respect to FIG. 3). The tool 210 includes a pair of flutes 216 defined via mutual positioning of the shank 212 and insert 214 with respect to one another. The insert 214 is received in a pocket of the shank 212 via an interference fit.

Cutting insert 214 includes a pair of cutting edges 220, each disposed adjacent to a respective flute 216. As can be appreciated, the cutting edges 220 will cut into a workpiece as the drill 210 is rotated in cutting direction C when engaging a workpiece. For the purpose of rotatably driving the cutting insert 214, the same includes two drive surfaces 222 that are dimensioned and disposed in a manner to be engaged by compatible torque transmission walls 224 of the shank 212. The drive surfaces 222 and torque transmission walls 224, alike, are usually each oriented along a plane that is essentially parallel with respect to longitudinal axis A. Though not explicitly illustrated here, rotation of the entire cutting tool 210 can be actuated via a separate driving element, such as a hand drill, drill press or machine tool, which causes the shank 212 to rotate.

As such, with the conventional arrangement illustrated in FIG. 3, the walls 224 and drive surfaces 222 alike are oriented in a direction (as shown in the figure) that results in a torque transmission force that is largely directed perpendicularly to the walls of the aforementioned pocket (that receives the insert 214 via interference fit). It has been found that this torque transmission force can produce significant stresses in critical regions of the shank 212 due to bending, thus representing a significant place for improvement. For centering and stability, To the extent that the insert 214 is mounted with an interference fit for a purpose of centering and stability, it can be appreciated that elastic deformation of the walls 224 creates stresses in the same areas as stresses caused by torque transmission. As will be appreciated more fully herebelow, broadly contemplated herein are arrangements for a drill where, advantageously, an interference fit is provided between an insert and a shank wherein high torque transmission capability is achieved by positioning the drive walls at a smaller angle (than is the case in FIG. 3) with respect to pocket centering walls.

Figure 4:
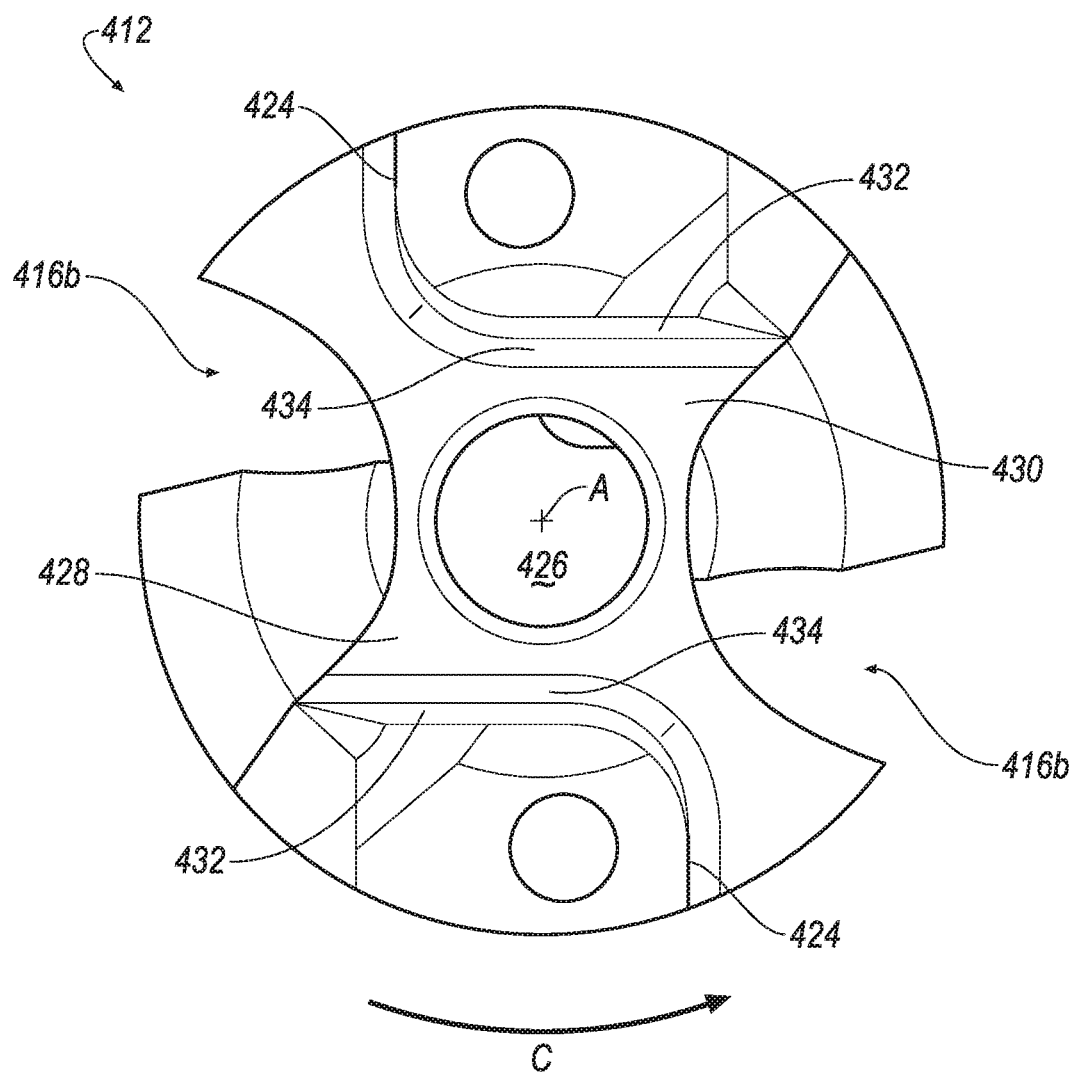
FIG. 4 provides a plan view of a shank.

FIG. 4 provides a plan view of a shank 412 in accordance with at least one embodiment. A pair of flute portions 416b are defined in the shank and are configured to interface with compatible flute portions of a cutting insert. Shank 412 includes a pocket 428 for accommodating a cutting insert; the principal elements of the latter include two centering walls 432 interconnected by a floor 430. The floor 430 can be oriented transversely with respect to central longitudinal axis A. Any or all of central floor portion 430 and centering walls 432 serve as abutment surfaces which contact a cutting insert when the cutting insert is installed on shank 412. As shown, a central (blind) hole or opening 426 is disposed centrally in the floor 430 (about axis A), and is configured to receive a centering pin of a cutting insert.

In a manner to be appreciated more fully below, the centering walls 432 deform to receive compatible portions of a cutting insert via an interference fit. Preferably, the centering walls 432 (or at least a portion thereof) are each inclined at an angle with respect to the central longitudinal axis A, inclined away from axis A in progressing toward a leading end of the shank 412. In accordance with at least one embodiment, as shown in FIG. 4, centering walls 432 are substantially straight (while inclined as noted), and parallel to one another, when viewed in a given, single horizontal plane that is transverse to axis A. (Here, it can also be understood that the centering walls 432 would, by extension, also be inclined with respect to that plane transverse to the axis A.)

In accordance with at least one variant embodiment, centering walls 432 may each be curved when viewed in a given, single horizontal plane that is transverse to axis A. In such variants, merely by way of illustrative and non-restrictive example, each wall 432 may be oriented along an arc that is substantially parallel to a circumference of the greater shank 412. Accordingly, taken together, such walls 432 would trace a generally frustoconical shape, narrowing as a function of proximity (in an axial direction) to the pocket floor 430.

Also shown in FIG. 4 are torque transmission walls 424 which, unlike the conventional example of FIG. 3, are configured and disposed to transmit a force to compatible drive surfaces of a cutting insert in a in a direction substantially parallel to the centering walls 432 This represents a significant improvement over the conventional example of FIG. 3, in that stresses produced in each of several critical areas of the pocket 428, of other portions of the shank 412, and of a cutting insert mounted therein, are considerably reduced.

Further advantages may be found in connection with insertion of a cutting insert into pocket 428. Here, to the extent that centering walls 432 end up deflecting radially outwardly with respect to axis A, such deflection may be transmitted to the torque transmission walls 424. However, in so doing, the torque transmission walls will deflect virtually in parallel to a radial direction with respect to axis A or very close thereto, essentially along their own horizontal dimension (that is, their dimension that is transverse to the axis A). This helps maintain face-to-face contact with drive surfaces of the cutting insert being clamped. In contrast, with a conventional arrangement such as that shown in FIG. 3, the torque transmission walls 224 therein shown will more or less deflect in a radial direction with respect to axis A, thus jeopardizing full face-to-face contact with cutting insert drive surfaces (such as those indicated at 222 in FIG. 3).

In the arrangement shown in FIG. 4, torque transmission walls 424 are oriented in parallel with respect to the central longitudinal axis A, when viewed in a generally longitudinal direction. In at least one variant embodiment, the walls 424 may be inclined with respect to the central longitudinal axis A (e.g. at an angle of between about 0 and about 10 degrees, preferably between about 2 and about 6 degrees, and/or may match the inclination of centering walls 432), in a direction opposite to the rotational cutting direction C of the shank 412, toward the leading end of the shank 412). (Here, it can be understood that in such a variant the torque transmission walls 424 would, by extension, also be inclined with respect a plane transverse to the central longitudinal axis.) Shallow semi-cylindrical troughs 434 may run along a bottom of each of the centering walls 432 and torque transmission walls 424, respectively; the troughs 434 can assist in reducing the stresses applied to the pocket 428 and to an insert alike.

In accordance with the aforementioned variant embodiment, when walls 424 are inclined with respect to axis A, it should be noted that when an insert is first positioned in the pocket 428, before clamping, the centering walls 432 and corresponding surfaces on the insert will make contact; there will be a gap between the insert and pocket floor 430 at that point. At the same time, there will be exist at that point another gap (though a significantly smaller one) between drive surfaces of the insert (e.g., such as drive surfaces 722 of the insert 714 shown in FIGS. 7A and 7B) and torque transmission walls 424. In this manner, when the insert is clamped and the centering walls 432 expand outwardly, the torque transmission walls 424 and corresponding drive surfaces on the insert may come into contact before any torque is applied to the insert (e.g., as may be applied in a subsequent drilling operation).

Generally, it can be appreciated with regard to various embodiments herein that an insert, when fully clamped in a shank (such as 412), the insert may contact the pocket floor 430, or there may indeed be a small gap between a bottom portion of a main head portion of the insert and the floor 430. Accordingly, while various views herein may not explicitly illustrate such a gap (e.g., for general ease of illustration), it should be understood and appreciated that such a gap can be considered to be present in accordance with one or more embodiments and/or variants.

Figure 5:
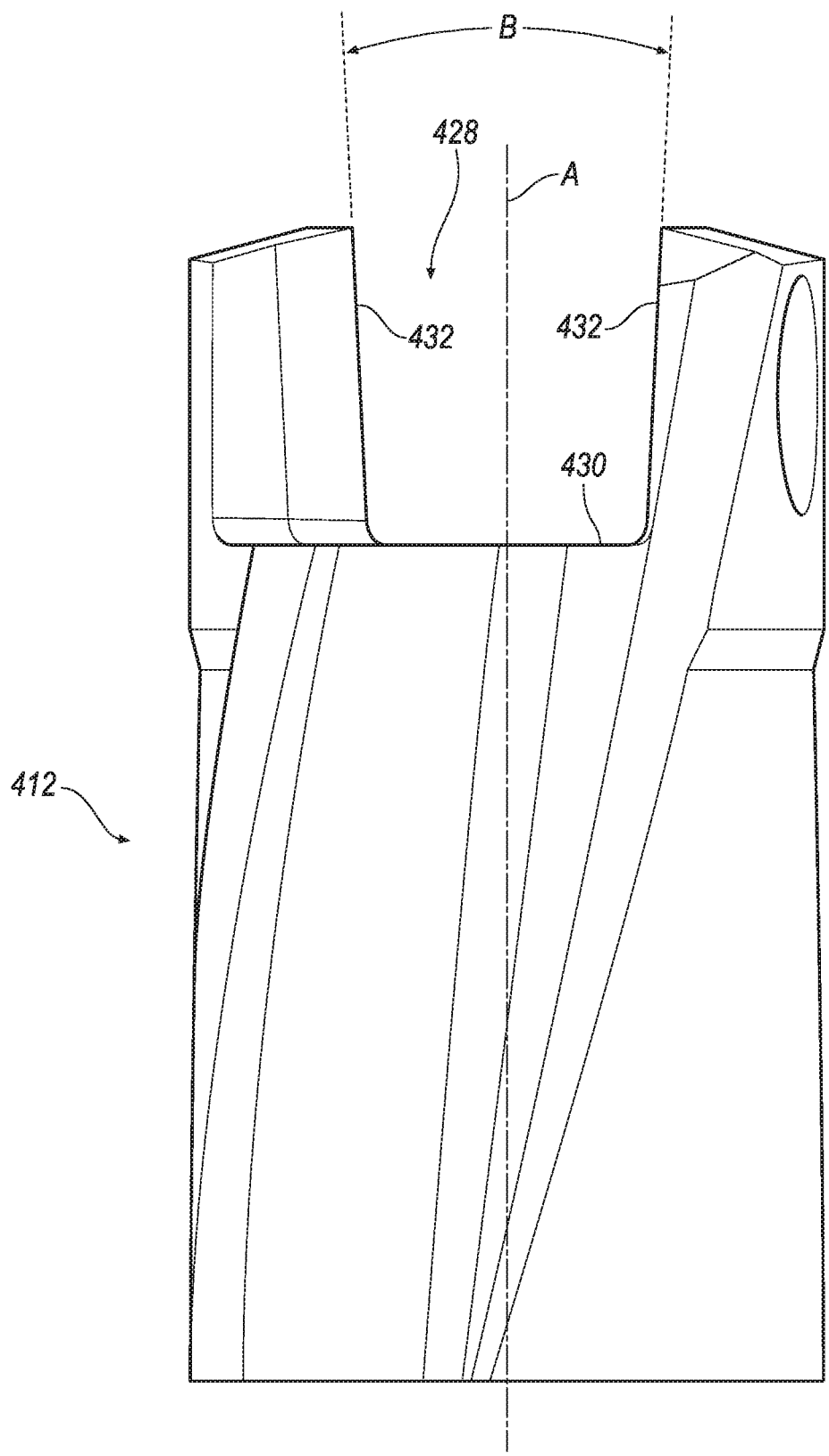
FIG. 5 provides an elevational view of the shank of FIG. 4.

FIG. 5 provides an elevational view of the shank 412 of FIG. 4. As shown, the centering walls 432 can be inclined symmetrically with respect to axis A and at a mutual angle B with respect to one another. The angle B could represent an angle of between about 3 and about 6 degrees, or alternatively could be defined as imparting to each wall 432 a slope of between about 1:20 and about 1:10. It should be understood and appreciated that, when being installed, a cutting insert initially will sit on centering walls 432 at a distance from the pocket floor 430 before it is fully clamped within the pocket 428. Accordingly, elastic deformation of the centering walls 432 will occur as the insert is pulled against the floor 430. (Further details relating to a clamping action, in accordance with at least one embodiment, will be better appreciated from the discussion further below.)

It can be further appreciated, in accordance with at least one embodiment, that with angled centering walls 432 as discussed above, interference caused upon initial insertion of a cutting insert will give rise to a relatively small displacement that then will be needed in fully clamping the insert within pocket 428 and in bumping-off the insert in order to then remove the insert. This stands in stark contrast to conventional arrangements with straight centering walls (relative to axis A) which typically give rise to a relatively larger displacement needed for fully clamping an insert within a pocket, and in then bumping-off the insert.

In accordance with at least one embodiment, as shown in FIG. 5, substantially the entirety of each centering wall 432, extending axially upwardly from the pocket floor 430 to the leading end of shank 412, is inclined as shown. In accordance with at least one variant embodiment, a lower portion of each centering wall 432 (i.e., a portion axially closer to pocket floor 430) is either not inclined at all (i.e., is parallel) with respect to axis A or is inclined at a different angle with respect to axis A than is an upper portion of each centering wall 432. In such variants, the upper portions of centering walls 432 can be understood to assume the angle B discussed above, and would still represent surfaces initially contacted by an insert, as the insert is received in pocket 428. In such variants, preferably at least about 50 to 75 percent of the axial extent of each centering wall 432 is represented by an upper portion which is inclined to assume the angle B discussed above.

Figure 6:
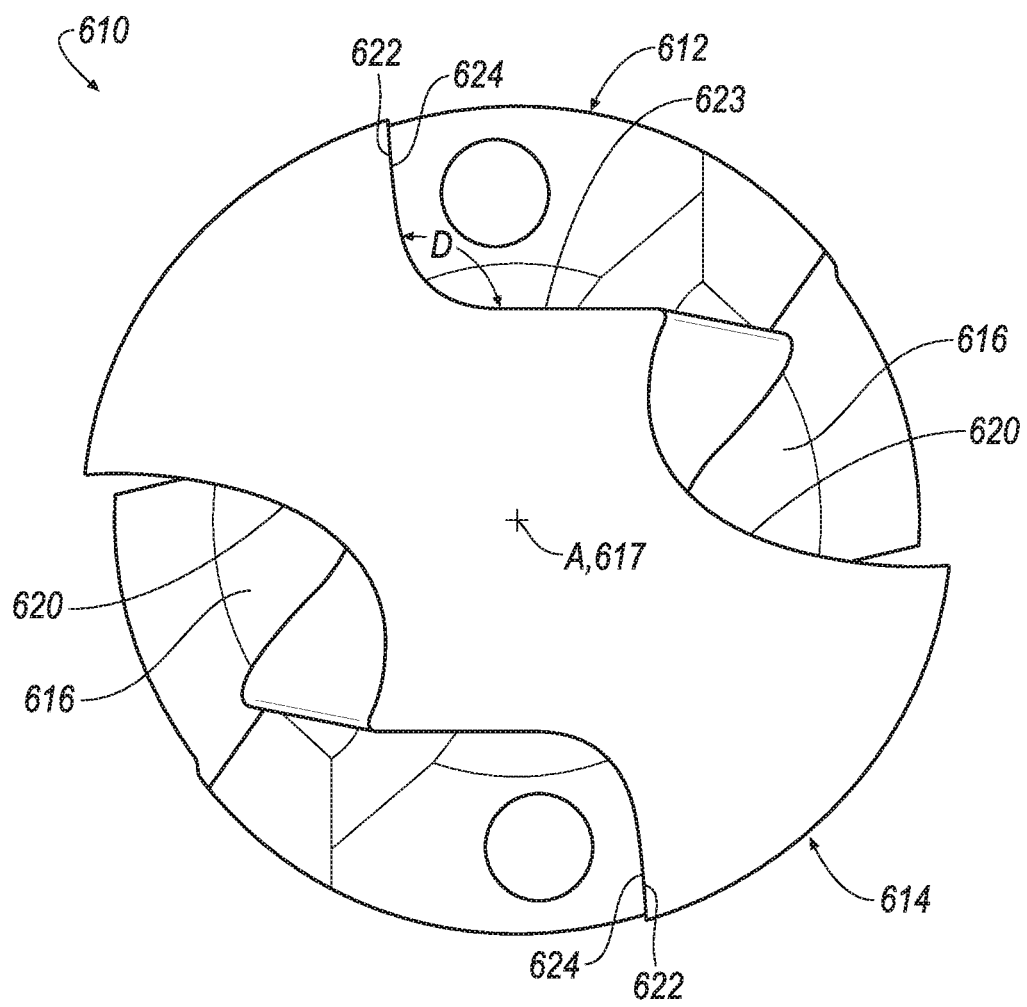
FIG. 6 provides a plan view of a shank and cutting insert installed therein.

FIG. 6 provides a plan view of a shank 612 and cutting insert 614 installed therein, in accordance with at least one embodiment. As shown, the cutting insert 614 includes drive surfaces 622 that are oriented to be compatible with torque transmission walls 624 of the shank 612. Preferably, when viewed transversely with respect to axis A (as indeed shown in FIG. 6), surfaces/walls 622 and 624 alike can be oriented such that a driving force is transmitted generally in a direction substantially parallel to the centering walls. As such, surfaces/walls 622 and 624 alike can be oriented at an angle D with respect to centering walls of the shank 612 (such as those indicated at 432 in FIGS. 4 and 5), and thus to a corresponding surface or side 623 of insert 614. By way of illustrative example, D could be between about 75 and about 120 degrees, or preferably between about 85 and about 100 degrees; most preferably, D can be approximately 90 degrees. It should be appreciated, in this vein, that a workable balance can preferably be found in choosing angle D, in that larger angles will tend reduce to stresses on insert 614 and increase stresses on the pocket (defined via centering walls of the shank 612), while smaller angles will tend to reduce stresses on the pocket (of shank 612) and increase stresses on the insert 614. It should be further appreciated that an arrangement such as that shown in FIG. 6 stands in stark contrast to that shown in FIG. 3, where an angle analogous to D would be well over 120 degrees, not even far from 180 degrees.

Generally stated, in accordance with at least one embodiment, the torque transmission walls 624 (and preferably the drive surfaces 622, when insert 614 is mounted in shank 612) can each be oriented at a predetermined angle (e.g., angle D) with respect to a defining dimension of at least one centering wall portion of shank 612 (which may be analogous to one or more centering walls such as those indicated at 432 in FIGS. 4 and 5). If the at least one centering wall portion is substantially straight when viewed in a given, single horizontal plane that is transverse to axis A, the defining dimension can be understood as a dimension in parallel with respect to the at least one centering wall portion. If, in accordance with at least one variant embodiment as described further above, the at least one centering wall portion is curved when viewed in a given, single horizontal plane that is transverse to the axis A (and, e.g., along an arc that is substantially parallel to a circumference of the greater shank 612), then the defining dimension can be understood as a tangent of the curvature of the at least one centering wall portion at a midpoint of the at least one centering wall portion.

Figure 7A:
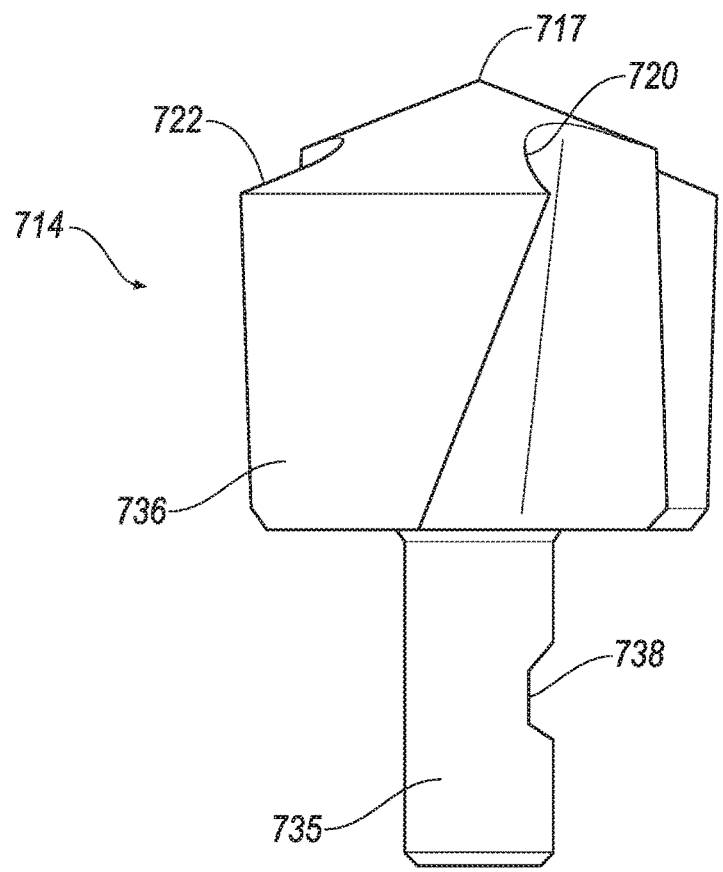
FIG. 7A provides an elevational view of a cutting insert.

FIG. 7A provides an elevational view of a cutting insert 714, in accordance with at least one embodiment. As shown, a generally cylindrical centering pin 735 extends axially away from a main head portion (or head) 736. A recess (or notch) 738 is provided in the shaft portion 735 to accommodate a setscrew, in a manner to be more fully appreciated herebelow. Such a recess can be configured in any suitable manner; by way of illustrative and non-restrictive example (and indeed as shown in FIG. 7A), it could be defined by a relatively flat surface oriented in parallel to a chord or secant defined by the cylindrical pin 735, flanked on the two axial sides by angled surfaces, one per side, that converge on the flat surface from an external circumference defined the pin 735. Also shown in FIG. 7A are cutting edges 720, drive surfaces 722 and a cutting tip 717 which may be regarded as analogous to similar components described and illustrated elsewhere herein. In a variant embodiment, two symmetrical notches/recesses 738 may be provided, disposed diametrically opposite from one another with respect to shaft portion 735.

Figure 7B:
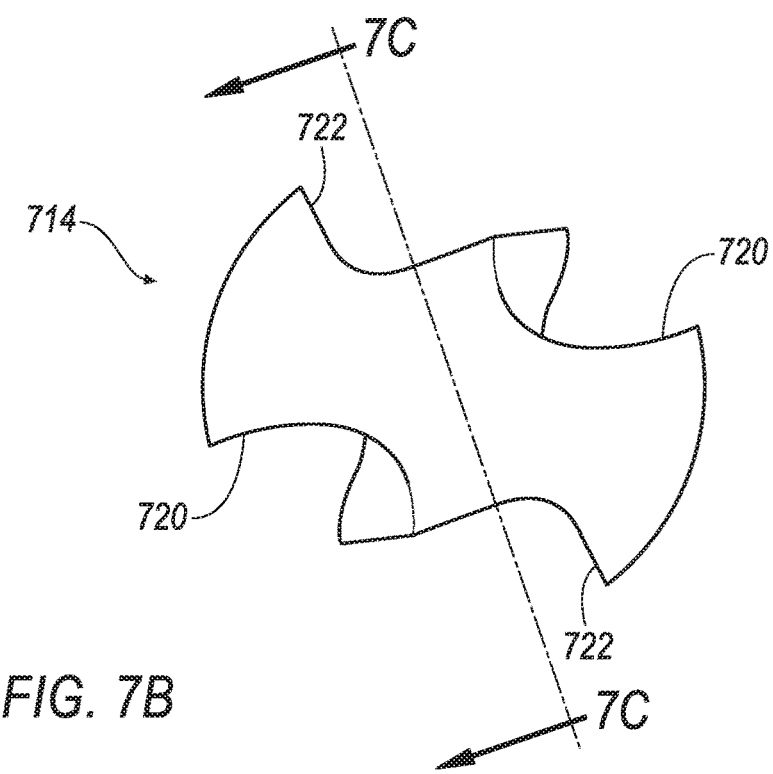
FIG. 7B provides a plan view of the cutting insert of FIG. 7A.

FIG. 7B provides a plan view of the cutting insert 714 of FIG. 7A. As shown, the drive surfaces 722 may be oriented in similar fashion to those indicated at 622 in FIG. 6.

Figure 7C:
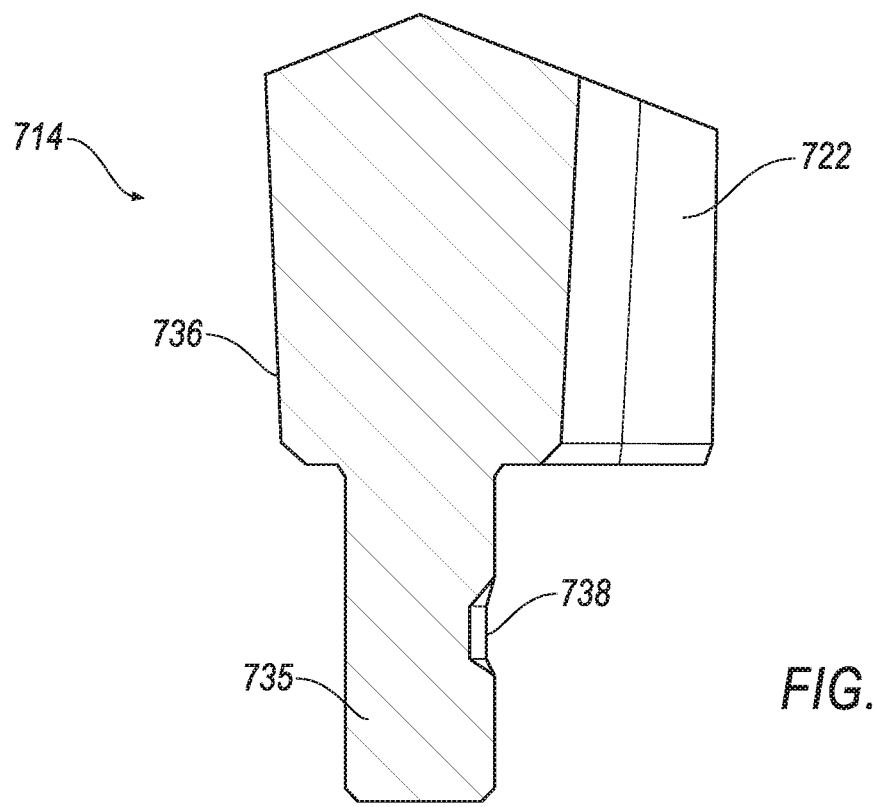
FIG. 7C provides an axial section taken through the line 7C-7C in FIG. 7B.

FIG. 7C provides an axial section taken through the line 7C-7C in FIG. 7B. Here, in particular, some viable proportional dimensions of recess 738 are shown.

Figure 7D:
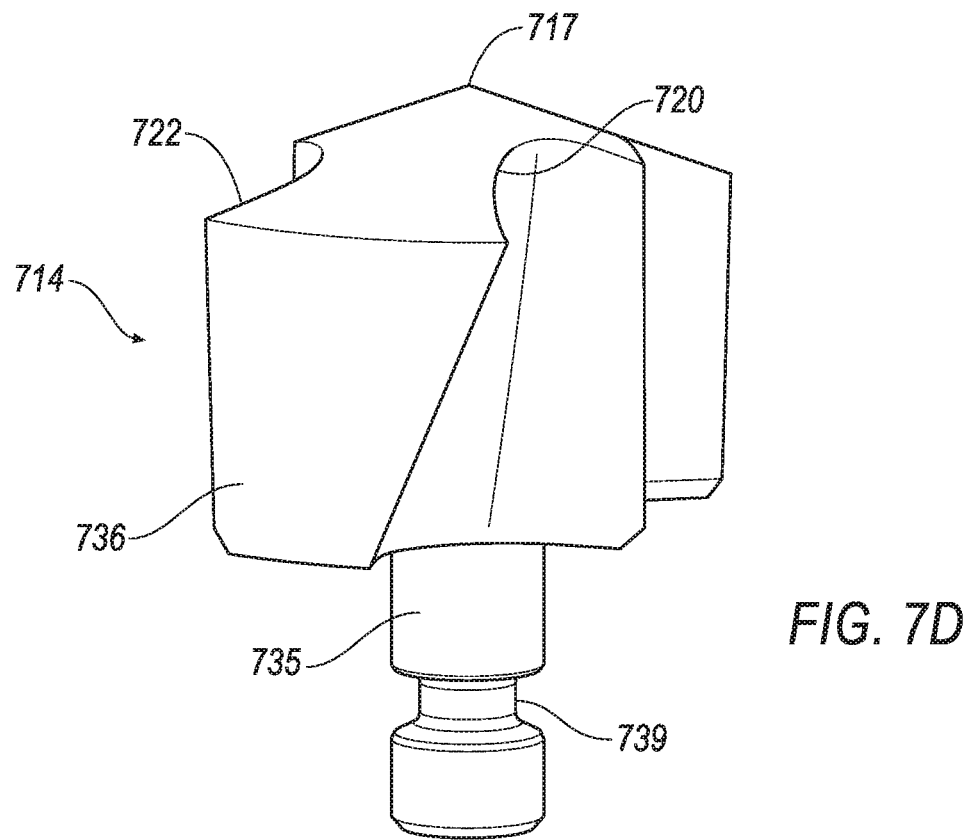
FIG. 7D provides an elevational view of a cutting insert, in accordance with at least one variant embodiment.

FIG. 7D provides an elevational view of a cutting insert 714, in accordance with at least one variant embodiment. Here, in place of the recess/notch 738 from FIGS. 7A-7C, there is an annular groove 739 for accommodating a setscrew. As shown, annular groove 739 may be recessed into centering pin 735 about an entire circumference of pin 735. Groove 739 may further be defined, substantially as shown, by an inner cylindrical surface (of lesser diameter than the remainder of centering pin 735 itself), flanked on the two axial sides by frustoconical surfaces, one per side, that converge on the inner cylindrical surface from an external circumference defined by the pin 735.

Figure 8:
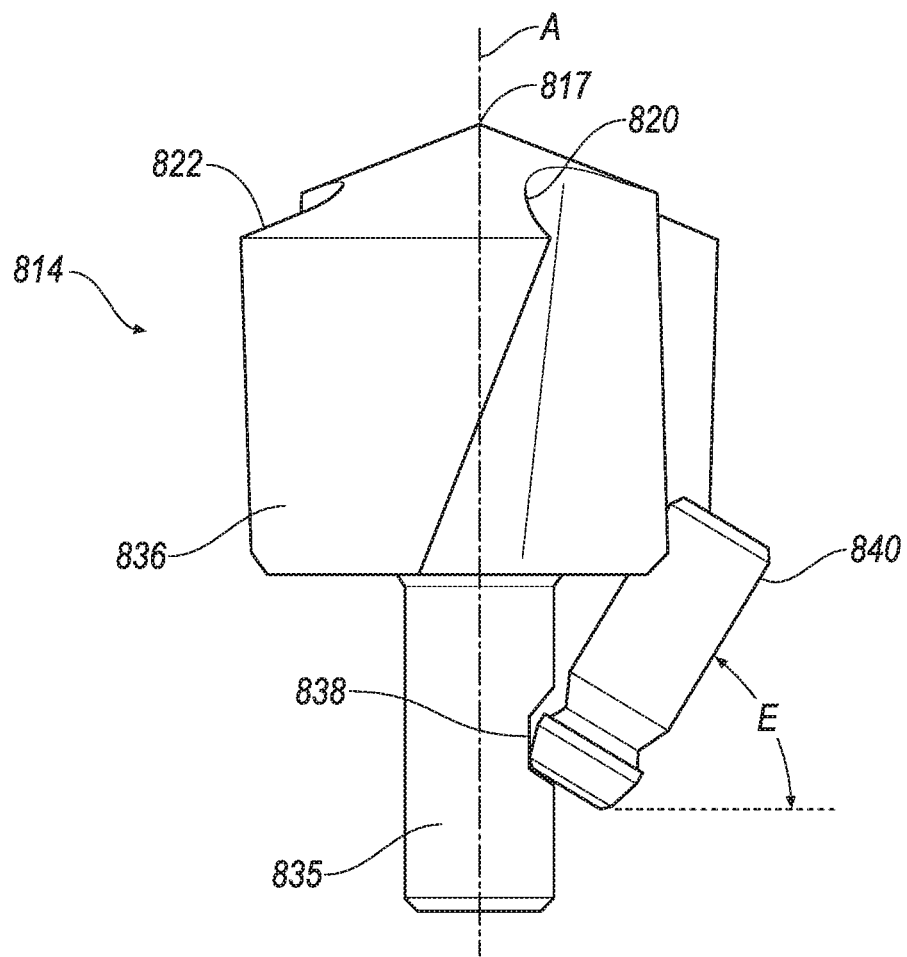
FIG. 8 provides essentially the same elevational view as FIG. 7A, but additionally showing an angled setscrew.

FIG. 8 provides essentially the same elevational view as FIG. 7A, but additionally showing an angled setscrew 840 in accordance with at least one embodiment. As shown, setscrew 840 may be inclined at an angle E with respect to the horizontal (i.e., to a plane which is transverse to axis A), to engage the recess 834 in a manner to be more fully appreciated herebelow. Setscrew 840, for its part, may be threadedly engaged in a compatible channel in order to translate in parallel to its own central longitudinal axis. To this end, it may be actuated at a rear portion thereof (i.e., at that end portion disposed away from recess 838), via a wrench tool or other arrangement that can displace the setscrew 840 in a rotational direction (about its own central longitudinal axis) to thereby translate the setscrew 840 via the aforementioned threaded engagement.

Figure 9A:
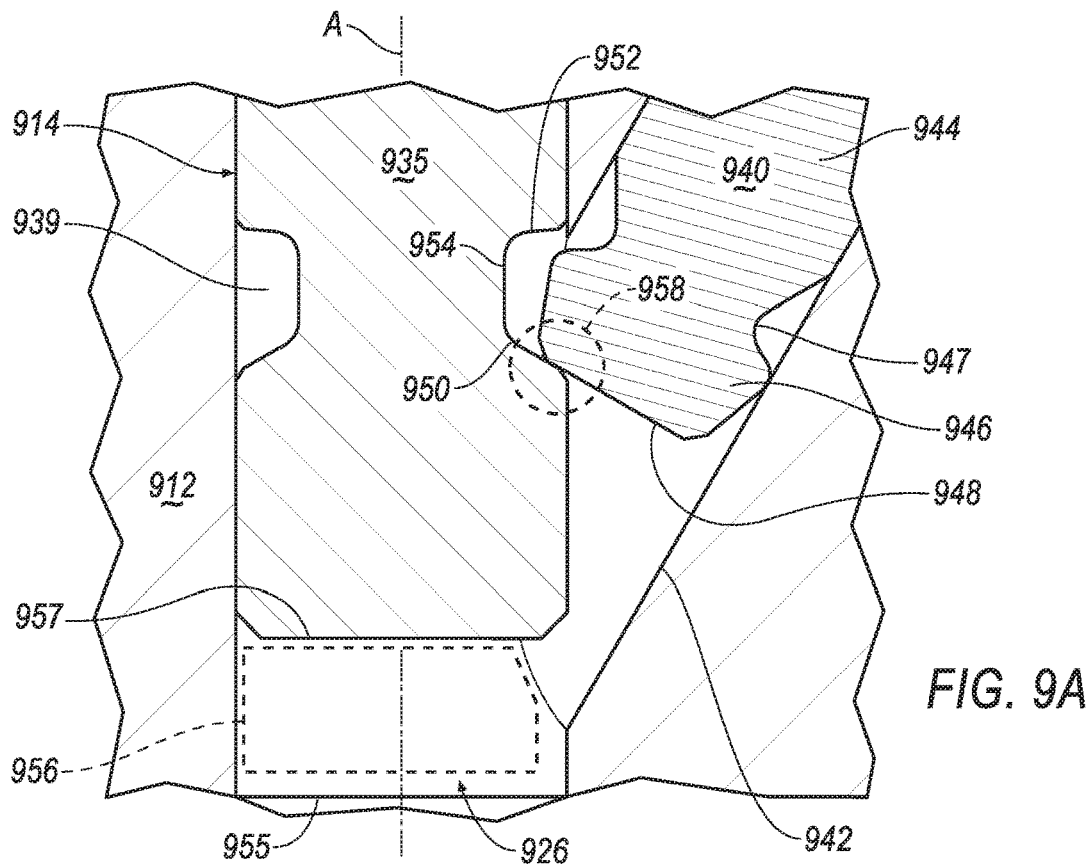
FIG. 9A schematically illustrates, in an elevational cross-sectional view, a cutting insert and a setscrew in an initial position for assembly FIG. 9B schematically illustrates the cutting insert and a setscrew of FIG. 9A, but in a "clamped" position.

In accordance with at least one embodiment, FIG. 9A schematically illustrates, in an elevational cross-sectional view, a cutting insert 914 and a setscrew 940 in an initial position for assembly. While in this illustration the centering pin 935 (of insert 914) includes an annular groove 939 (e.g., similar to that indicated at 739 in the view of FIG. 7D), it should be understood that the ensuing discussion can also apply to the case of engaging with a recess or notch, e.g., similar to the one indicated at 738 in FIG. 7A.

As shown in FIG. 9A, setscrew 940 may be disposed in a dedicated channel (or hole) 942 in a manner to reciprocally translate within the channel/hole 942. As noted above, such movement may be promoted via mutual threaded engagement between setscrew 940 and channel/hole 942, but in accordance with at least one variant embodiment the setscrew 940 may be slidingly disposed within the channel/hole 942. In accordance with at least one other variant embodiment, the setscrew 940 and channel/hole 942 may be configured such that part of the reciprocal movement is via threaded engagement and part of such movement is via sliding displacement.

For its part, in accordance with at least one embodiment, the setscrew 940 includes a main shaft portion 944 and a head portion 946, with a narrowed neck region 947 disposed therebetween. Head portion, as shown, may be tapered (e.g., via a frustoconical outer surface) in a direction generally toward the insert 914. A distal end of setscrew 940 (i.e., an end disposed toward the insert 914 with respect to an axial direction of the setscrew 940) may also be defined by a flat, circular end surface 948.

In accordance with at least one embodiment, groove 939 may include a first angled surface 950 (disposed toward a trailing end of centering pin 935), a second angled surface 952 (disposed toward a leading end of centering pin 935) and an inner cylindrical wall 954 extending therebetween. As such, first angled surface 950 may be dimensioned so as to engage with the end surface 948 of setscrew 940 as shown (in the initial position for assembly). It should be understood and appreciated that similarly configured and disposed surfaces may be provided the case of a recess that does not extend fully about a circumference of centering pin 935 (e.g., such as recess 738 in FIG. 7A). Further, while angled surfaces 950/952 and cylindrical wall 954 are shown and described by way of non-restrictive and illustrative example, it should be understood that variants on these may be employed. For instance, wall 954 need not necessarily be cylindrical, e.g., it may be inclined with respect to axis A and even could assume two or more distinct portions along an axial dimension. Angled surfaces 950/952 may, themselves, be angled differently than shown in FIG. 9A and could even run strictly transversely with respect to axis A.

Figure 9B:
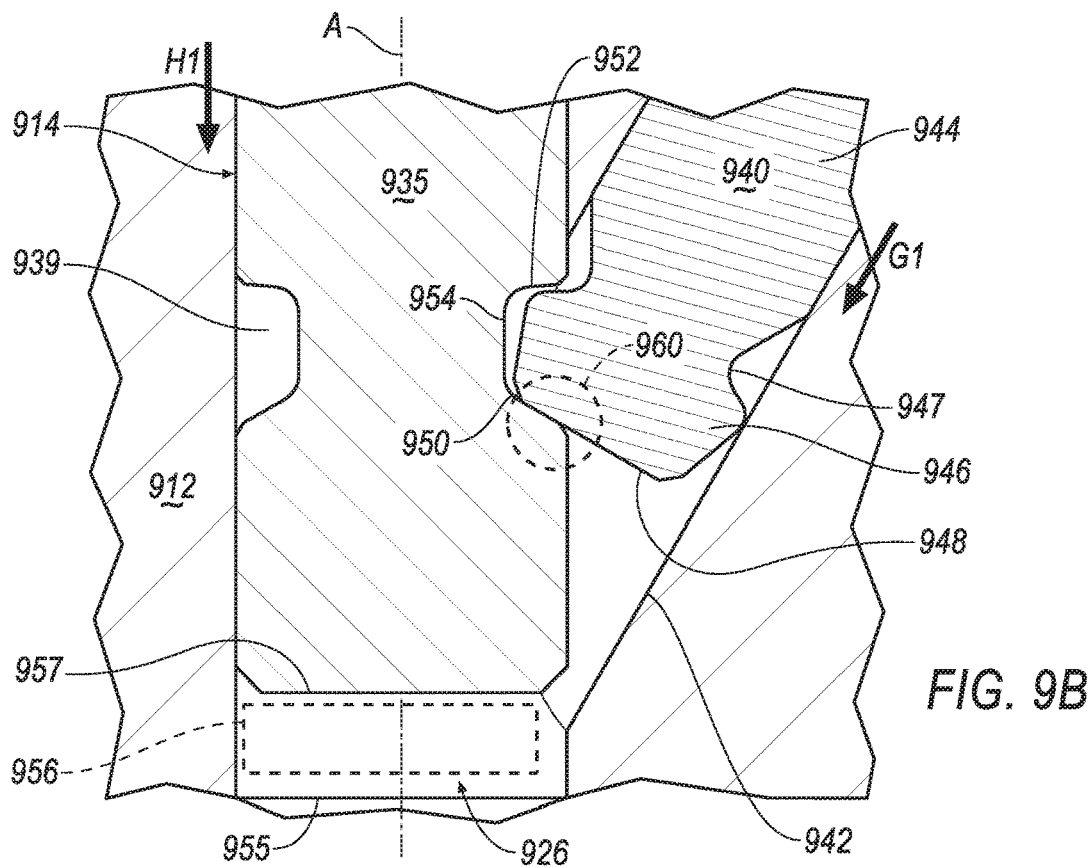
FIG. 9C schematically illustrates the cutting insert and a setscrew of FIG. 9A, but in a position set for "bump-off" or disassembly FIG. 10 provides a plan view of a shank in accordance with at least one variant embodiment, including a wrench tool for displacing a cutting insert.

In accordance with at least one variant embodiment, setscrew 940 may be configured without a narrowed neck region 947 such that it merely terminates, at its distal end, via a beveled outer surface that converges to a flat, circular end surface. In such a variant, "bump-off" can be undertaken by way of a wrench tool such as that indicated at 1070 in FIG. 10 (and as described in further detail herebelow). For clamping, the setscrew can be positioned at an angle E (as referenced in FIG. 8) such that either the end face thereof sits on surface 950, or the beveled/frustoconical outer surface of the setscrew sits on surface 950; either way, this can create an axial clamping force that still urges the cutting insert 914 in direction H1 as shown in FIG. 9B.

As shown, the shank includes a central hole 926 for accommodating the centering pin 935 of cutting insert 914. Preferably, the centering pin 935 will have a precise slide fit with respect to the central hole 926. As such, the side component of the clamping force created by the setscrew 940 will be supported by the wall of hole 926, thus preventing excessive displacement of the pin; it can be appreciated that any such excessive displacement could otherwise cause the insert 914 to lose its concentricity with the axis of rotation A, and/or cause breakage of the pin 935. The combination of a precise fit between pin 935 and hole 926, in conjunction with the interference fit between insert 914 and a pocket of shank 912 (such as pocket 428 in FIG. 4) will ensure that the insert 914 is clamped in a correct position and remains stable in its position during operation. As such, it can be appreciated that in at accordance with at least one embodiment the hole 926 and pin 935 may assume a circular cross-section when viewed two-dimensionally (in a plane transverse to axis A), and a generally cylindrical configuration when viewed three-dimensionally. However, in accordance with at least one variant embodiment, the hole 926 and pin 935 may assume any of a wide variety of other possible two-dimensional cross-sectional shapes, e.g., an oblong (stadium) or elliptical shape.

The central hole 926 may also include a lowermost portion (toward the trailing end of shank 912), or floor 955. To help ensure that the pin 935 (and of cutting insert 914) initially sits at a predetermined position for proper engagement with the front portion 946 of setscrew 940, a deformable element 956 may be provided between that lowermost surface 957 and the floor 955. Preferably, the deformable element 956 biases the centering pin 935 upwardly (i.e., toward a leading end of shank 912). Merely by way of illustrative and non-restrictive example, the deformable element 956 may take the form of an O-ring, a spring or a ball plunger. In accordance with a variant embodiment, a similar or analogous deformable element may be placed—as an alternative to element 956 or in addition thereto—on the floor of a pocket, such as floor 430 shown in FIGS. 4 and 5; this alternative or additional element would then bias axially upwardly a seating surface of an associated cutting insert.

As shown, in FIG. 9A, the end surface 948 of setscrew 940 contacts the first angled surface 950 of shaft 935 over an initial contact area, itself shown within the dotted circle 958. The manner of engagement between setscrew 940 and shaft 935 then changes in a manner to be appreciated more fully herebelow.

In accordance with at least one embodiment, FIG. 9B schematically illustrates the cutting insert and a setscrew of FIG. 9A, but in a "clamped" position. To achieve a "clamped" position, the setscrew 940 is translated within channel 942 (e.g., via rotation and the aforementioned threaded engagement), in a direction G1, to cause the shaft 935 (and thus the cutting insert 914) to move axially downwardly (i.e., in direction H1). This will cause the entire cutting insert 914 to move axially downwardly in a pocket of the shank 912 (e.g., such as pocket 428 in FIGS. 4 and 5), whereupon centering walls of the pocket (e.g., such as walls 432 in FIGS. 4 and 5) will deform elastically in a radially outward direction (with respect to axis A). This will then promote an interference fit of the insert 914 within shank 912 (as also discussed hereabove), such that the insert 914 is then securely clamped within shank 912. Also, once in the "clamped" position, the deformable element 956 is deformed in an axial direction of the insert 914 and the end surface 948 of setscrew 940 comes to contact the first angled surface 950 over a somewhat larger area (e.g., as denoted within dotted circle 960) than was the case in the initial assembly position (see FIG. 9A, and dotted circle 958).

Figure 9C:
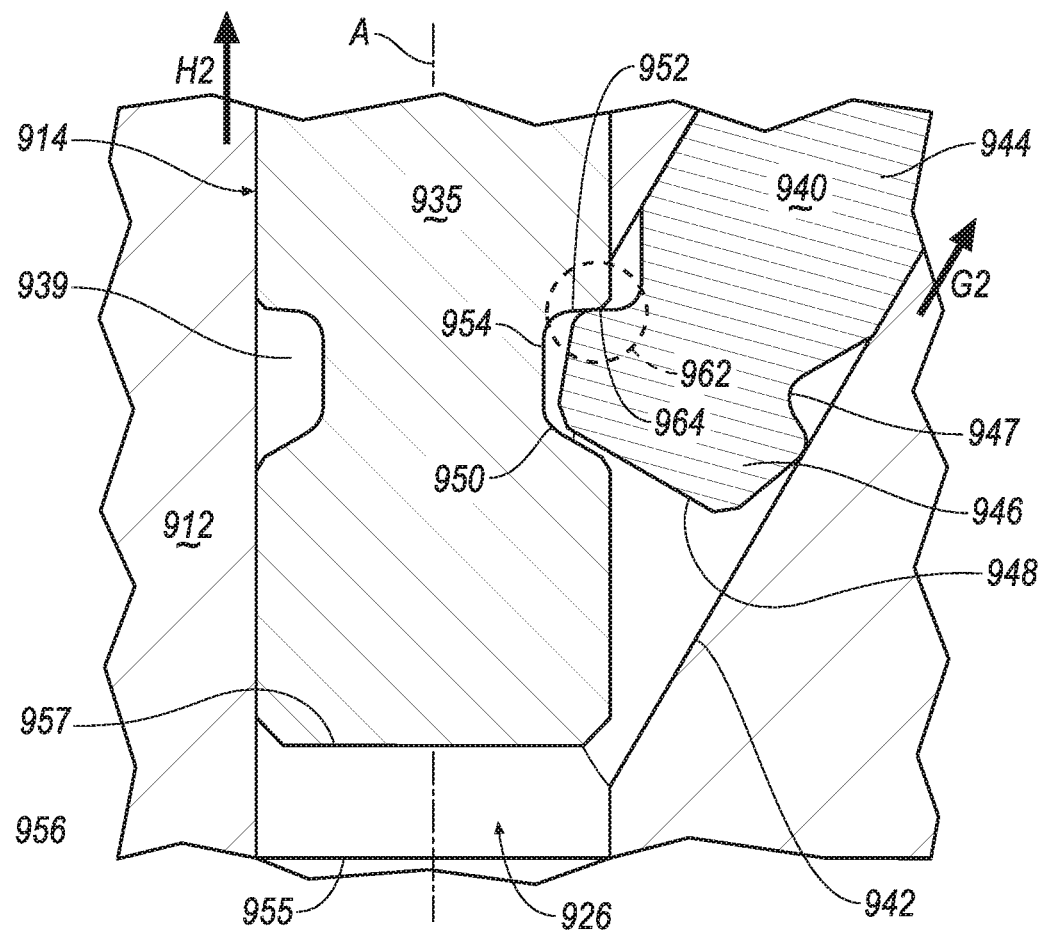

In accordance with at least one embodiment, FIG. 9C schematically illustrates the cutting insert and a setscrew of FIG. 9A, but insert still in a "clamped" position and setscrew already positioned for bump-off. As such, the "bump-off" action takes place when the setscrew 940 undergoes reverse translational movement, as indicated by arrow G2, then (via an upper bump-off surface 964 of head portion 946) contacts the second angled surface 952 in a manner as shown within dotted circle 962. This then causes the centering pin 935 (and cutting insert 914) to displace axially in a "return" direction as indicated by arrow H2. The insert will be pushed out of pocket and must overcome the frictional forces exerted by the pocket walls (due to interference fit).

In accordance with at least one embodiment, the surfaces 952 and 964 described and illustrated with respect to FIGS. 9A-9C may preferably be oriented in a horizontal direction, that is, perpendicular to axis A. This will help facilitate a bump-off force that is applied substantially in an axial direction (H2).

Preferably, surfaces 948 and 950 may be oriented substantially in parallel with respect to one another, in order to facilitate direct engagement in applying and distributing a clamping force, as well as mutual sliding engagement when transitioning between an initial position for assembly (FIG. 9A) and a clamped position (FIG. 9B). Further, both surfaces may preferably be oriented in a direction that is transverse to the angle E referenced in FIG. 8. The angle formed by either or both surfaces (948 and 950) with respect to the horizontal (i.e., a plane perpendicular to axis A), and/or the angle E referenced in FIG. 8, can be determined in a manner deemed suitable on the basis of different factors including, but not limited to: available, needed or desired physical dimensions of the setscrew 940 and/or channel/hole 942; and a desired or needed clamping force as applied by setscrew 940, with its axial component acting in direction H1.

Available physical dimensions of the setscrew 940 and/or channel/hole 942, for instance, may be constrained by dimension of a pocket of the shank 912 and/or its associated walls (e.g., such as the pocket 428 and walls 432 in FIG. 4). Thus, in theory, while an angle E (as referenced in FIG. 8) may ideally be 90 degrees to ensure a direct application of an axial clamping force (of setscrew 940 on insert 914), with possible angles of zero degrees formed by either of both of surfaces 948/950 with respect to the horizontal (i.e., a plane perpendicular to axis A), in reality various physical constraints may inform an angle E (as referenced in FIG. 8) of no greater than about 70 to about 80 degrees. However, it should be noted that one or more variant embodiments may well make a provision for applying an axial clamping force in a direction more closely in parallel with respect to axis A; this could be achieved, e.g., via a concave or angled end surface of setscrew 940, or via a physical extension of (or component physically attached to) setscrew 940 that extends outwardly from setscrew 940 and itself is oriented in a horizontal direction (i.e., perpendicular to axis A).

Figure 10:
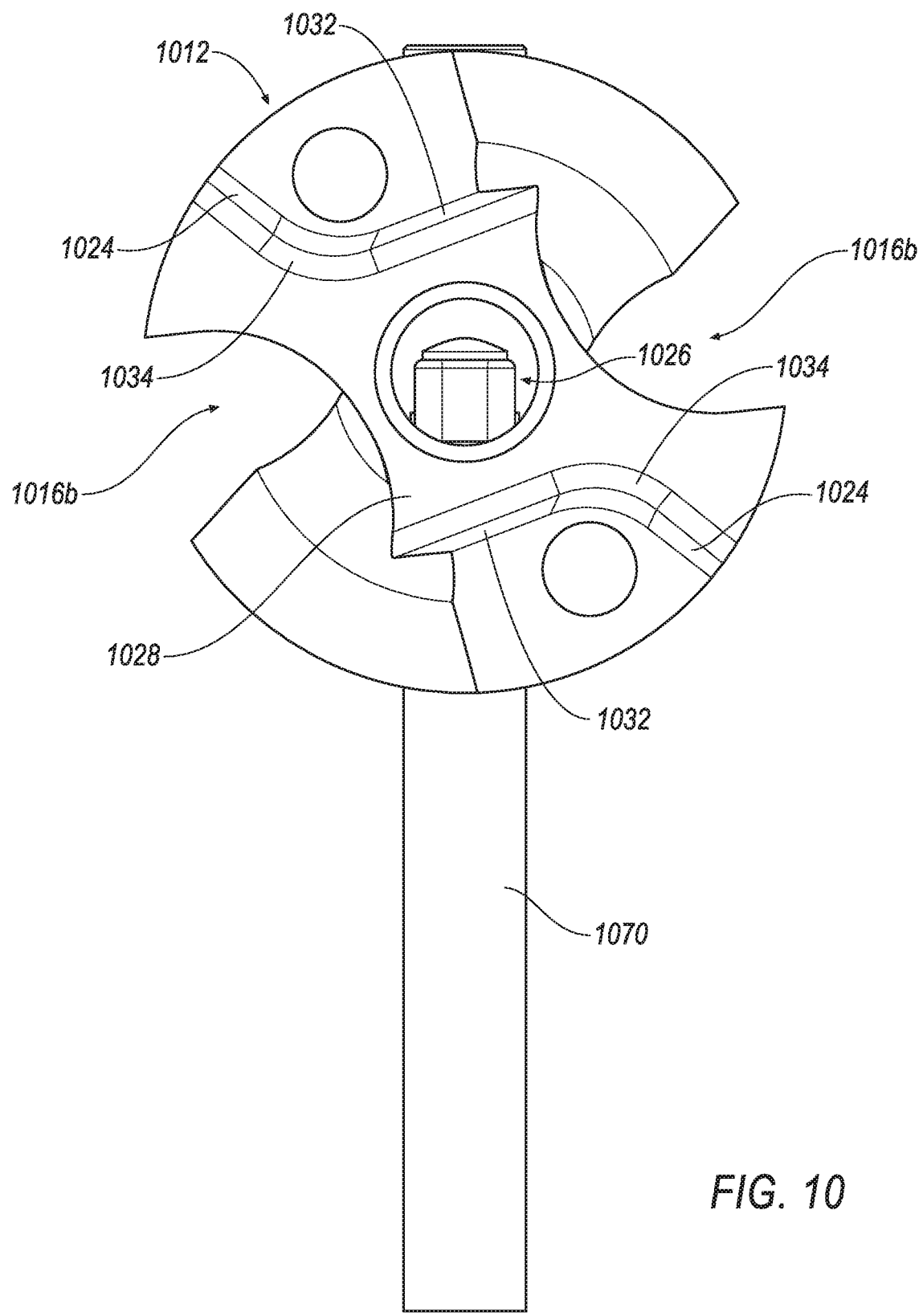

FIG. 10 provides a plan view of a shank 1012 in accordance with at least one variant embodiment, including a wrench tool 1070 for displacing a cutting insert. Here, centering walls 1032 of pocket 1028 may be disposed, configured and oriented similarly to the walls 432 shown in FIGS. 4 and 5. Additionally, in another variant with respect to the main embodiments contemplated with respect to FIGS. 4 and 5, torque transmission walls 1024 may themselves be oriented at a similar vertical angle as centering walls 1032. (Here, it can be understood that the torque transmission walls 1024 and centering walls 1032 alike are inclined with respect to the central longitudinal axis and, by extension, to a plane transverse to the central longitudinal axis.) In a manner to be appreciated more fully below, a dedicated wrench tool 1070 may be employed to effect a type of clamping and bump-off action as described heretofore, and analogously so with respect to the examples of FIGS. 9B and 9C.

Figure 11A:
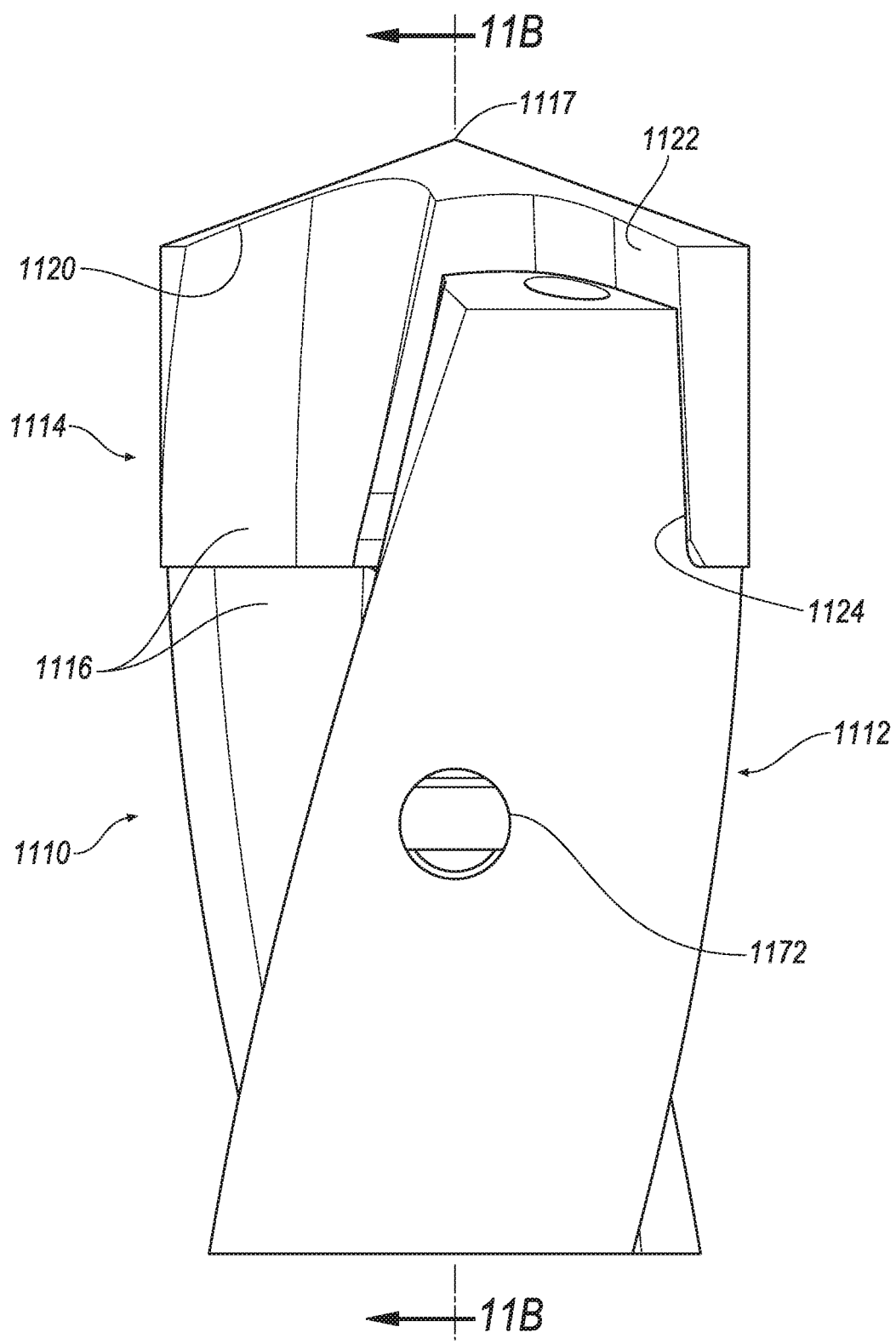
FIG. 11A provides a front elevational view of a shank and cutting insert in a clamped position, in accordance with at least one variant embodiment.

FIG. 11A provides a front elevational view of a shank and cutting insert in a clamped position, in accordance with at least one variant embodiment. As shown, the cutting tool 1110 with shank 1112 and cutting insert 1114 may present general similarities to analogous components shown and described with respect to other embodiments discussed and illustrated herein. However, analogously to FIG. 10 discussed above, a radial hole 1172 for including a wrench tool may also be included, the function of will be appreciated more fully from the ensuing discussion.

Figure 11B:
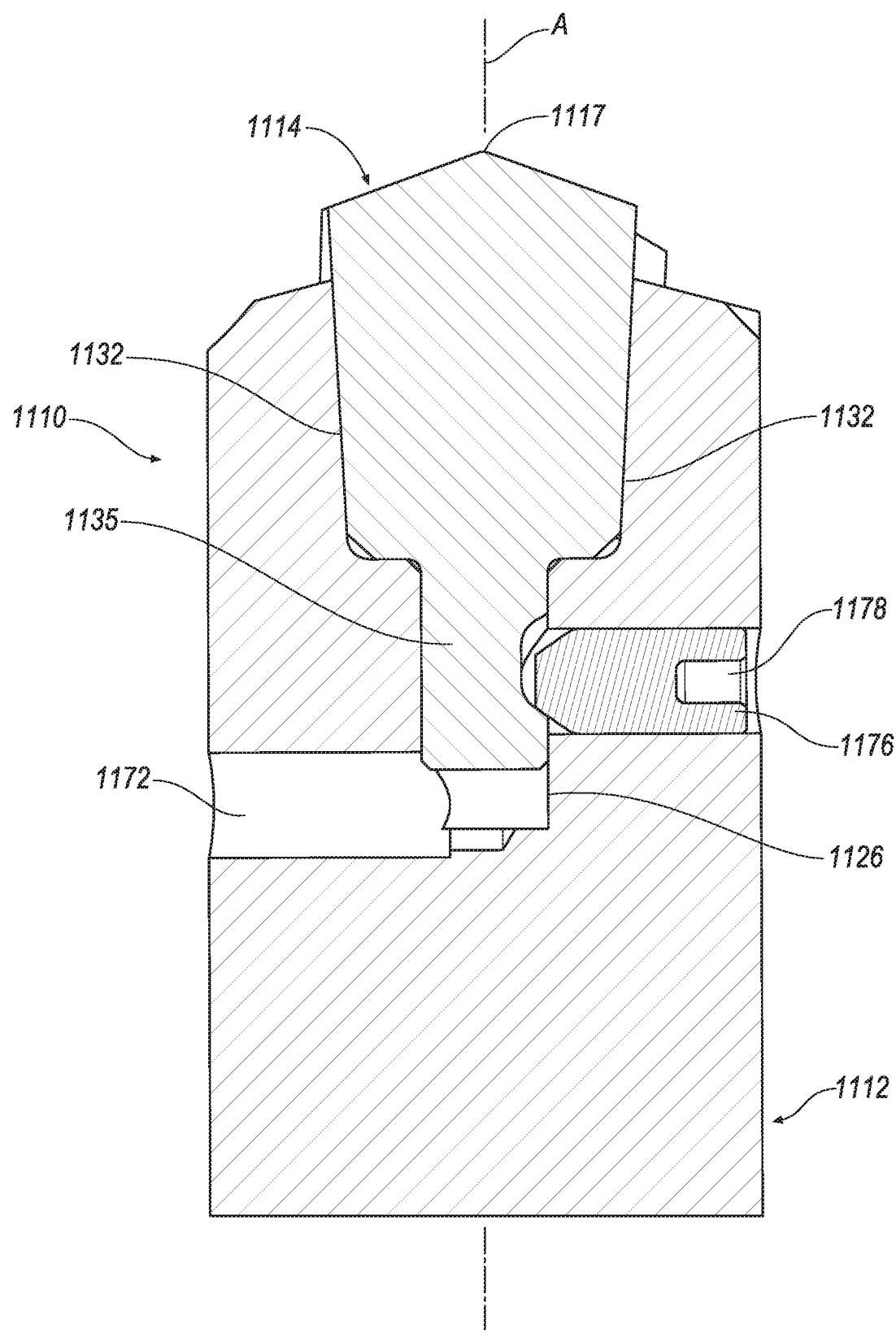
FIG. 11B provides an axial section taken through the line 11B-11B in FIG. 11A.

As such, FIG. 11B provides an axial section taken through the line 11B-11B in FIG. 11A. As shown, radial hole 1172 may be regarded as a blind hole, in that it terminates in the central hole 1126 of shank 1112. Similarly to other embodiments discussed and illustrated herein, centering walls 1132 of shank 1112 may be dimensioned so as to accommodate cutting insert 1114 via an interference fit. As such, a wrench tool (such as that indicated at 1070 in FIG. 10) will be selectively removable and insertable with respect to radial hole 1172; the orientation and function of a wrench tool therein will be better appreciated from further discussion herebelow.

At the same time, there may preferably be provided a setscrew 1176 which is oriented in a horizontal direction with respect to cutting insert 1114, or in a direction that is transverse to central axis A. The setscrew 1176 can reciprocate within its own channel (that extends in a radial direction with respect to the axis A), via threaded engagement between the two. To actuate translational motion of the setscrew 1176 within its own channel, a wrench tool, such as one as indicated at 1070 in FIG. 10, may be employed to rotate the setscrew 1176 about its own rotational axis. To this end, a protrusion of the wrench tool may be inserted in a compatible recess 1178 located at a back end of the setscrew 1176 (i.e., at an end of the setscrew disposed away from the axis A).

It should be appreciated that FIG. 11B illustrates the cutting insert 1114 in a "clamped" position, analogously to FIG. 9B. As will be better appreciated herebelow, "bump-off" is facilitated via rotating a wrench tool (such as that indicated at 1070 in FIG. 10) within radial hole 1172, whereby an end protrusion of the wrench tool contacts a bottom surface of centering pin 1135 and urges the same to move upwardly (i.e., toward the leading edge end the cutting tool 1110). Also, to permit "bump-off", setscrew 1176 should be translated away from central axis A, to permit cutting insert 1114 to move axially upwardly in an unhindered manner.

Figure 12A:
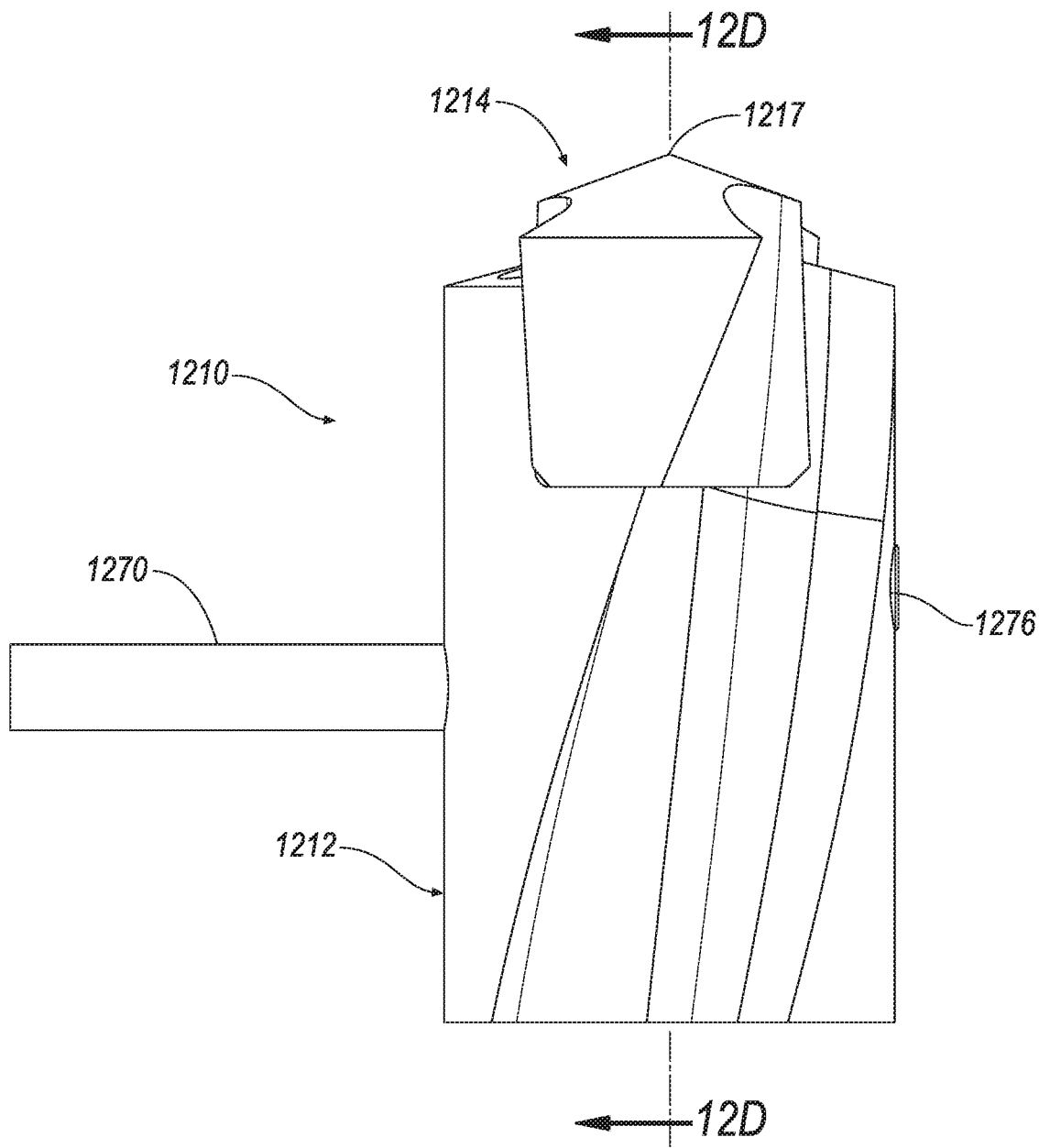
FIG. 12A provides a side elevational view of a shank and cutting insert in accordance with at least one variant embodiment similar to FIG. 11A, but with a wrench tool 1270 inserted, and in a position set for "bump-off" or disassembly.

FIG. 12A provides a side elevational view of a shank and cutting insert in accordance with at least one variant embodiment similar to FIG. 11A, but with a wrench tool 1270 inserted, and in a position set for "bump-off" or disassembly. Again, the cutting tool 1210 with shank 1212 and cutting insert 1214 may present general similarities to analogous components shown and described with respect to other embodiments discussed and illustrated herein, while the function of wrench tool 1270 may be appreciated more fully from the ensuing discussion.

Figure 12B:
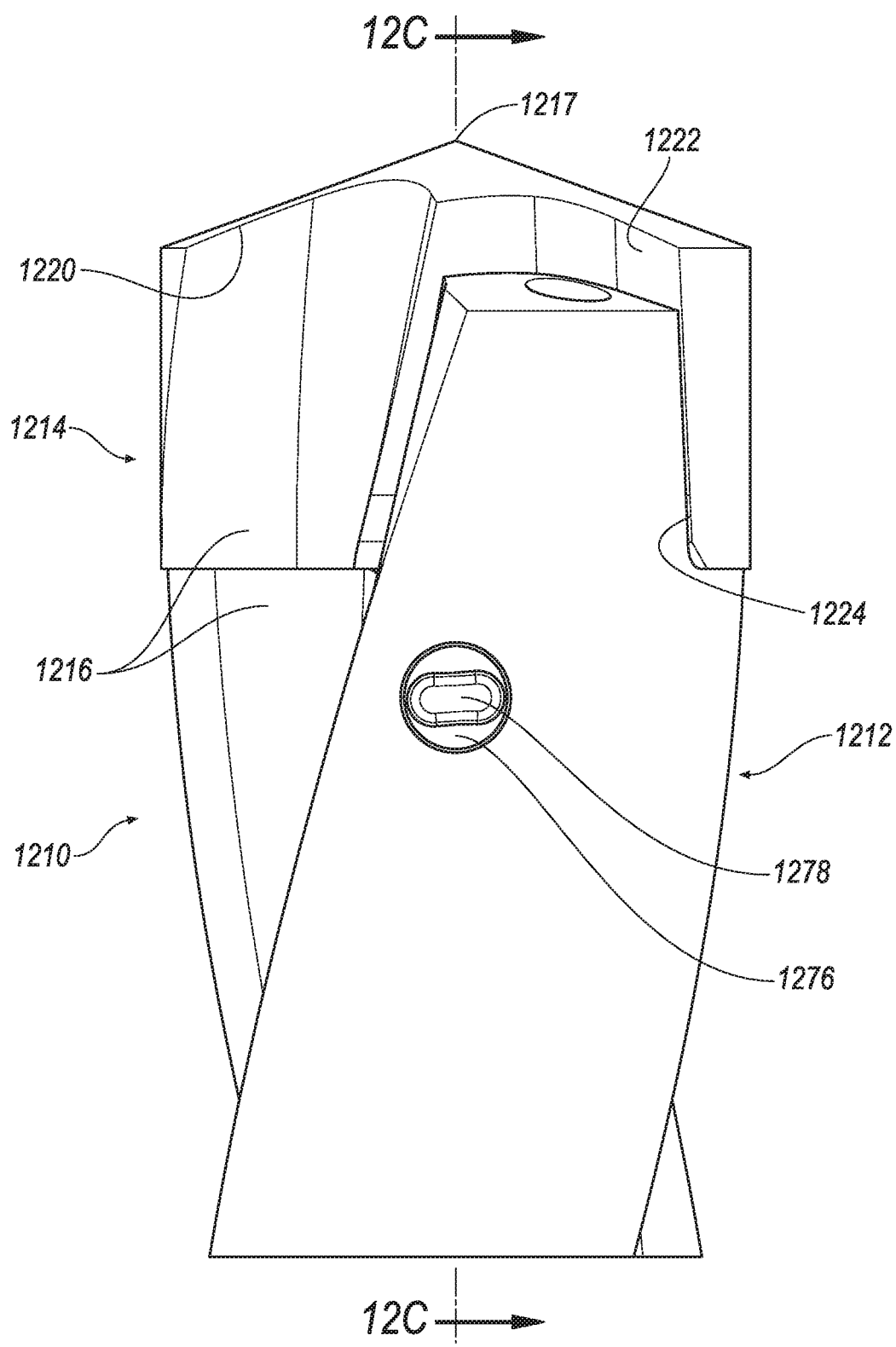
FIG. 12B provides a rear elevational view of the shank and cutting insert shown in FIG. 12A.

FIG. 12B provides a rear elevational view of the shank and cutting insert shown in FIG. 12A. Accordingly, shown here in addition are a setscrew 1276 with a recess 1278, substantially similar to analogous components in FIG. 11B.

Figure 12C:
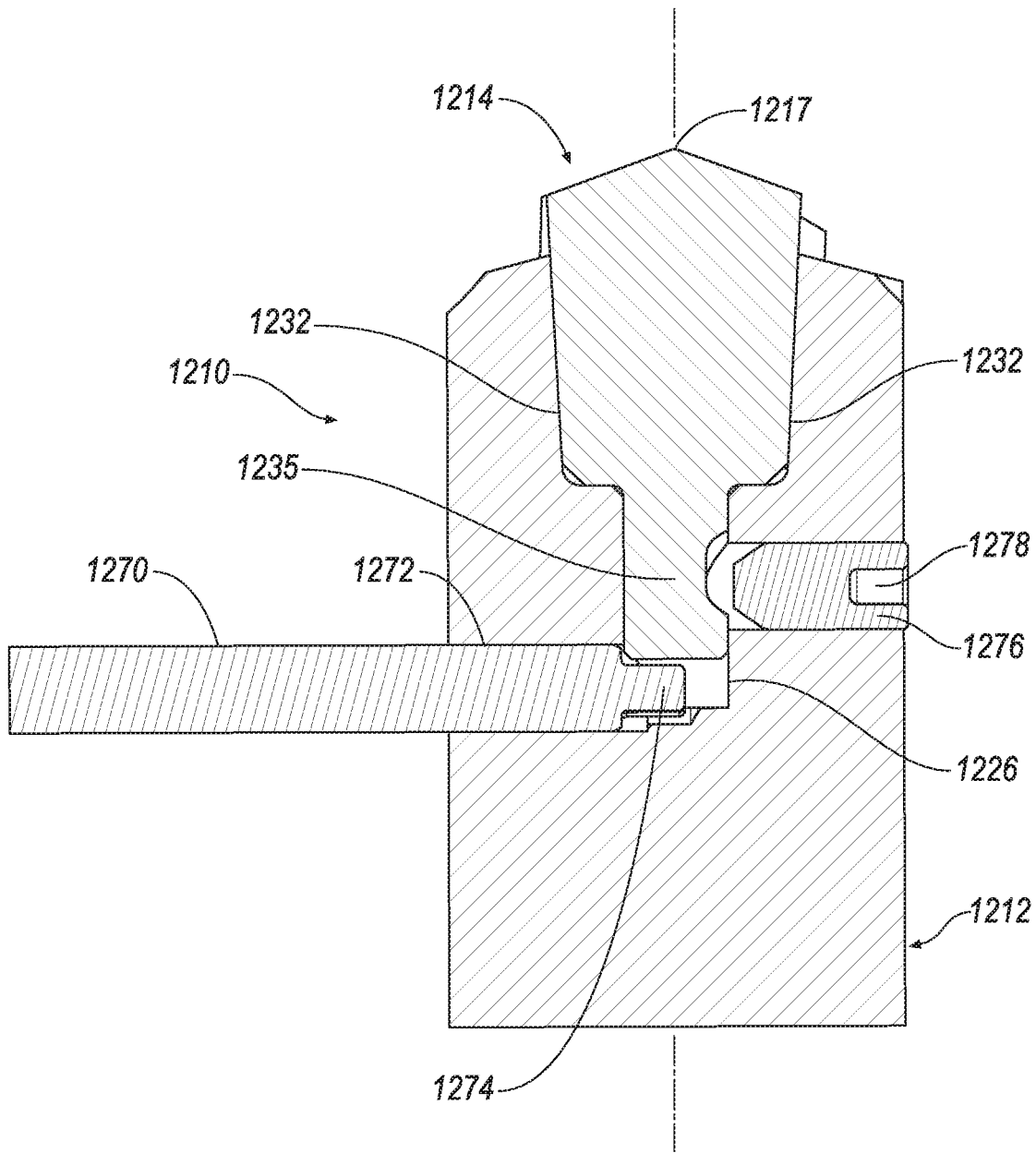
FIG. 12C provides an axial section taken through the line 12C-12C in FIG. 12B.

FIG. 12C provides an axial section taken through the line 12C-12C in FIG. 12B. As shown, the wrench tool 1270 is disposed in radial hole 1272; again, the latter is embodied as a blind hole that terminates in the central hole 1226 of shank 1212. Again, centering walls 1232 of shank 1212 may be dimensioned so as to accommodate cutting insert 1214 via an interference fit. For its part, the wrench tool 1270 is selectively removable and insertable with respect to radial hole 1272, and includes an end protrusion 1274 that may be dimensioned to fit in the space beneath a bottom portion (i.e., a trailing end portion) of centering pin 1235 of insert 1214 as shown in FIG. 11A.

Also shown is the setscrew 1276, oriented in a horizontal direction with respect to cutting insert 1214, or in a direction that is transverse to central axis A. The setscrew 1276 can reciprocate within its own channel (that extends in a radial direction with respect to the axis A), via threaded engagement between the two. To actuate translational motion of the setscrew 1276 within its own channel, the wrench tool 1270 may be employed to rotate the setscrew 1276 about its own rotational axis. To this end, the protrusion 1274 of wrench tool 1270 may be inserted in the compatible recess 1278 located at a back end of the setscrew 1276 (i.e., at an end of the setscrew disposed away from the axis A).

It should be appreciated that FIG. 12C indeed illustrates the cutting insert 1214 in a condition ready for "bump-off", or disassembly, analogously to FIG. 9C. Thus, "bump-off" here will be facilitated merely via rotating the wrench tool 1270 within its radial hole 1272, whereby the end protrusion 1274 contacts a bottom surface of centering pin 1235 and urges the same to move upwardly (i.e., toward the leading edge end the cutting tool 1210), thereby releasing the insert 1214 from the pocket centering walls 1232 (and thus, from the pocket itself). Also, to permit "bump-off", setscrew 1276 (as shown) can be translated away from central axis A, to permit cutting insert 1214 to move axially upwardly in unhindered manner.

Figure 12D:
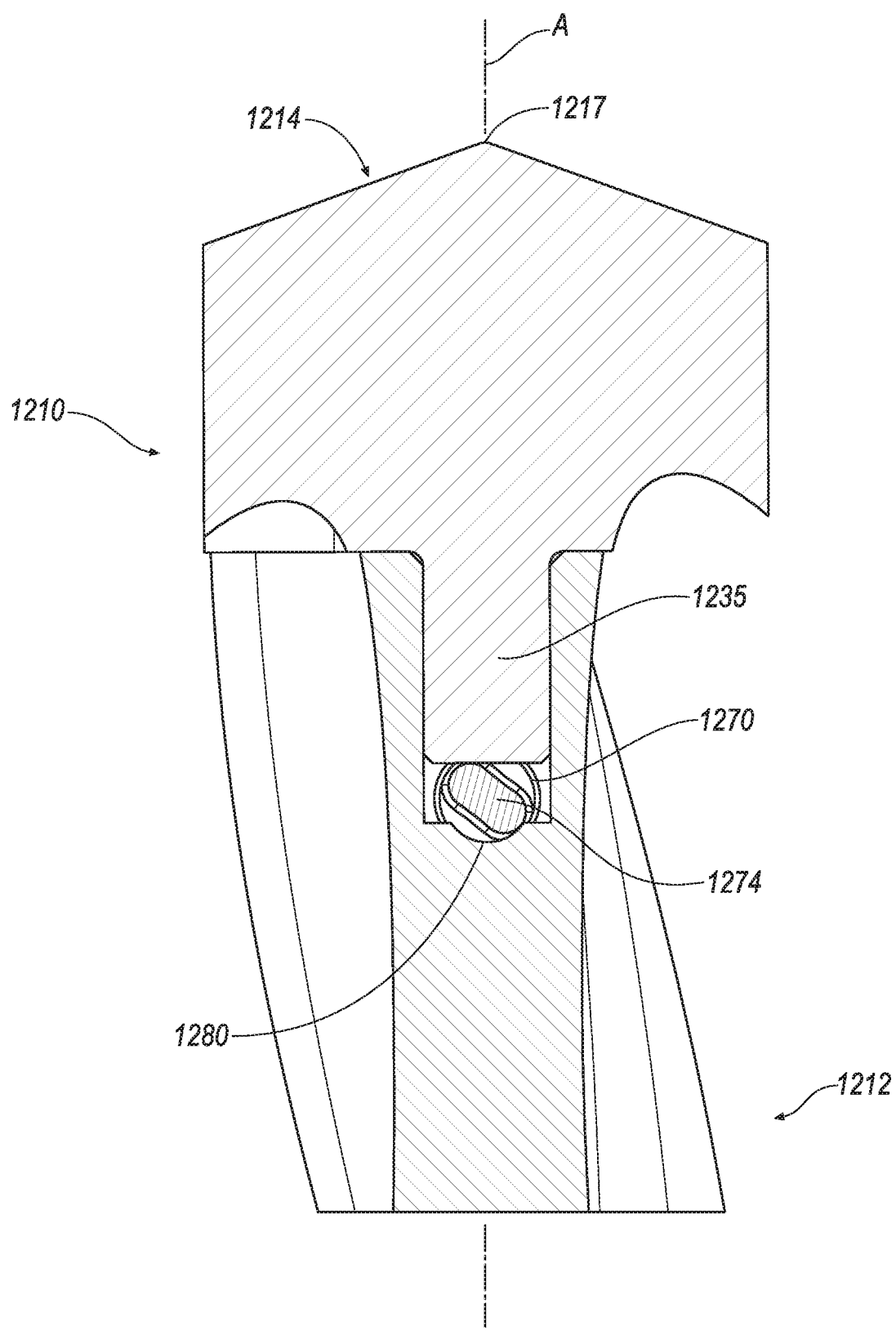
FIG. 12D provides an axial section taken through the line 12D-12D in FIG. 12A.

FIG. 12D provides an axial section taken through the line 12D-12D in FIG. 12A. As shown, the protrusion 1274 of wrench tool 1270 may be shaped as a stadium (geometric shape) in cross-section. A curved trough 1280 may thus be provided to accommodate rotational movement of protrusion 1274, wherein both components are shaped compatibly to permit such movement. The trough 1280, for its part, can be understood to be an extension of the radial hole 1272 shown in FIG. 12A and serve as a support to withstand the force created by the interaction between protrusion 1274 and the bottom portion of pin 1235.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A rotary cutting tool comprising:
    a shank; and
    an interchangeable cutting tip;
    said shank comprising a pocket which receives said interchangeable cutting tip;
    said pocket comprising two centering wall portions which, when viewed along a central longitudinal axis of said shank, are oriented at a first angle with respect to one another, the first angle being greater than zero; and
    a setscrew mounted in said shank and oriented at a second angle with respect to a plane transverse to the central longitudinal axis for axially displacing said interchangeable cutting tip from an initial position to a clamped position, and for axially displacing said interchangeable cutting tip from the clamped position to a bump-off position,
    wherein said two centering wall portions deform to receive said interchangeable cutting tip via an interference fit as said interchangeable cutting tip is displaced from the initial position to the clamped position,
    wherein, to effect displacement of said interchangeable cutting tip between the initial position and the clamped position:
    a first surface on said setscrew contacts a second surface on said interchangeable cutting tip over a first contact area;
    said setscrew translates in a first direction; and
    said interchangeable cutting tip thereupon moves axially from the initial position to the clamped position in which the setscrew contacts the interchangeable cutting tip over a second contact area that is larger than the first contact area,
    wherein, to effect displacement of said interchangeable cutting tip between the clamped position and the bump-off position:
    a third surface on said setscrew contacts a fourth surface on said interchangeable cutting tip over a third contact area;
    said setscrew translates in a second direction opposite to the first direction; and
    said interchangeable cutting tip thereupon moves axially from the clamped position to the bump-off position, and
    wherein frictional forces from the interference fit are overcome as said interchangeable cutting tip is displaced from the clamped position to the bump-off position.

2. The rotary cutting tool according to claim 1, wherein said setscrew undergoes translational movement in parallel with respect to the second angle.

3. The rotary cutting tool according to claim 1, wherein the second angle is less than about 90 degrees.

4. The rotary cutting tool according to claim 1, wherein the second angle is less than or equal to about 70 degrees.

5. The rotary cutting tool according to claim 1, wherein said interchangeable cutting tip comprises a recessed portion which is contacted by said setscrew in the clamped position.

6. The rotary cutting tool according to claim 1, wherein at least one of said first and second surfaces is oriented at an angle of greater than or equal to about 10 degrees with respect to a plane transverse to the central longitudinal axis.

7. The rotary cutting tool according to claim 1, wherein at least one of said third and fourth surfaces is oriented at an angle of about zero degrees with respect to a plane transverse to the central longitudinal axis.

8. The rotary cutting tool according to claim 1, wherein the first angle is between about 3 degrees and about 6 degrees.

9. The rotary cutting tool according to claim 1, wherein:
    said shank includes a pair of torque transmission walls for rotationally driving said interchangeable cutting tip about the central longitudinal axis of said shank;
    at least one of said torque transmission walls being oriented at a third angle with respect to a defining dimension of at least one of said centering wall portions, when measured in a plane transverse to the central longitudinal axis;
    the third angle being between about 75 degrees and about 120 degrees.

10. The rotary cutting tool according to claim 9, wherein the third angle is between about 85 degrees and about 100 degrees.

11. The rotary cutting tool according to claim 9, wherein said torque transmission walls are oriented at a non-zero angle with respect to a plane transverse to the central longitudinal axis of said shank.

12. The rotary cutting tool according to claim 9, wherein:
    said interchangeable cutting tip comprises a pair of drive surfaces which each contact a corresponding one of said torque transmission walls when said interchangeable cutting tip is in the clamped position;
    said drive surfaces each being oriented at the third angle with respect to an outer circular trace of said shank.

13. The rotary cutting tool according to claim 1, wherein:
said cutting tip includes a main head portion, and centering pin which extends axially away from said main head portion; and
said shank includes a central hole which receives said centering pin of said cutting tip via a slide fit.

14. The rotary cutting tool according to claim 1 wherein:
said pocket comprises a floor; and
in the initial position, said interchangeable cutting tip sits on the two centering wall portions at a distance from said floor.

15. The shank according to claim 9, wherein the defining dimension is:
a dimension in parallel with respect to at least one of the centering wall portions; or
a tangent of at least one of the centering wall portions.

16. The rotary cutting tool according to claim 1, wherein the displacement of said interchangeable cutting tip from the initial position to the clamped position is smaller than if the first angle were equal to zero.

17. A rotary cutting tool comprising:
a shank; and
an interchangeable cutting tip;
said shank comprising a pocket which receives said interchangeable cutting tip;
said pocket comprising two centering wall portions which, when viewed along a central longitudinal axis of said shank, are oriented at a first angle with respect to one another, the first angle being greater than zero; and
a setscrew mounted in said shank and oriented at a second angle with respect to a plane transverse to the central longitudinal axis for axially displacing said interchangeable cutting tip from an initial position to a clamped position,
wherein said two centering wall portions deform to receive said interchangeable cutting tip via an interference fit as said interchangeable cutting tip is displaced from the initial position to the clamped position;
a channel disposed in said shank; and
a wrench tool which is insertable into said channel for translational and rotational movement within said channel;
wherein, upon undergoing rotational movement within said channel about a longitudinal axis of said wrench tool, said wrench tool effects displacement of said interchangeable cutting tip between the clamped position and a bump-off position,
wherein said wrench tool comprises a protrusion which, upon rotational movement of said wrench tool within said channel, displaces said interchangeable cutting tip between the clamped position and the bump-off position, and
wherein said setscrew includes a recess which accommodates said protrusion of said wrench tool, to permit rotational displacement of said setscrew, driven by said wrench tool.

18. The rotary cutting tool according to claim 17, wherein said channel includes a trough which accommodates said protrusion and permits rotational displacement of said protrusion about the longitudinal axis of said wrench tool.

19. A rotary cutting tool comprising:
a shank; and
an interchangeable cutting tip;
said shank comprising a pocket which receives said interchangeable cutting tip;
said pocket comprising two centering wall portions which, when viewed along a central longitudinal axis of said shank, are oriented at a first angle with respect to one another, the first angle being greater than zero;
wherein said two centering wall portions deform to receive said interchangeable cutting tip via an interference fit upon initial insertion of said interchangeable cutting tip into said pocket;
said interchangeable cutting tip being axially displaceable between:
an initial position, which is assumed by said interchangeable cutting tip upon being received in said pocket of said shank;
a clamped position, wherein said interchangeable cutting tip is fixedly held with respect to said shank; and
a bump-off position, wherein said interchangeable cutting tip is not fixedly held with respect to said shank;
a holding element which holds said interchangeable cutting tip in the clamped position; and
a bump-off element which displaces said interchangeable cutting tip between the clamped position and the bump-off position;
said holding element comprising a setscrew which is mounted in said shank and oriented at a second angle with respect to a plane transverse to the central longitudinal axis;
wherein said setscrew undergoes translational movement in parallel with respect to the second angle;
a channel disposed in said shank; and
a wrench tool which is insertable into said channel for translational and rotational movement within said channel;
wherein, upon undergoing rotational movement within said channel about a longitudinal axis of said wrench tool, said wrench tool effects displacement of said interchangeable cutting tip between the clamped position and the bump-off position;
wherein said wrench tool comprises a protrusion which, upon rotational movement of said wrench tool within said channel, displaces said interchangeable cutting tip between the clamped position and the bump-off position; and
wherein said setscrew includes a recess which accommodates said protrusion of said wrench tool, to permit rotational displacement of said setscrew, driven by said wrench tool.

* * * * *